(12) United States Patent
Eguchi

(10) Patent No.: US 11,654,716 B2
(45) Date of Patent: May 23, 2023

(54) NONPNEUMATIC TIRE

(71) Applicant: BRIDGESTONE CORPORATION, Tokyo (JP)

(72) Inventor: Sinichi Eguchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 523 days.

(21) Appl. No.: 16/869,996

(22) Filed: May 8, 2020

(65) Prior Publication Data

US 2020/0262241 A1 Aug. 20, 2020

Related U.S. Application Data

(63) Continuation of application No. PCT/JP2018/040614, filed on Oct. 31, 2018.

(30) Foreign Application Priority Data

Nov. 10, 2017 (JP) .............................. JP2017-217300

(51) Int. Cl.
*B60C 1/00* (2006.01)
*B60C 7/18* (2006.01)
*B60C 7/10* (2006.01)
*B60C 7/00* (2006.01)
*B60C 7/08* (2006.01)
(Continued)

(52) U.S. Cl.
CPC .................. *B60C 1/00* (2013.01); *B60C 7/00* (2013.01); *B60C 7/08* (2013.01); *B60C 7/107* (2021.08); *B60C 7/18* (2013.01); *B60C 7/146* (2021.08); *B60C 2001/0091* (2013.01); *B60C 2011/0025* (2013.01)

(58) Field of Classification Search
CPC .. B60C 7/00; B60C 7/107; B60C 7/08; B60C 7/146; B60C 2001/0091; B60C 2011/0025
See application file for complete search history.

(56) References Cited

U.S. PATENT DOCUMENTS 8,950,451 B2   2/2015  Abe
9,387,725 B2   7/2016  Fudemoto et al.
(Continued)

FOREIGN PATENT DOCUMENTS

CN        103189215 A    7/2013
CN        104736354 A    6/2015
(Continued)

OTHER PUBLICATIONS

International Search Report for PCT/JP2018/040614 dated Feb. 5, 2019 (PCT/ISA/210).
(Continued)

*Primary Examiner* — Kip T Kotter
(74) *Attorney, Agent, or Firm* — Sughrue Mion, PLLC

(57) ABSTRACT

An object of the present disclosure is to provide a non-pneumatic tire having a small temperature dependence of ride comfort, providing a good ride comfort over a wide temperature range, and having an excellent durability. A solution thereto is a non-pneumatic tire (1) using a resin composition for a framework member, the resin composition having a bending modulus of elasticity at −20° C. according to ISO 178 of 1600 MPa or less, and a bending modulus of elasticity at 60° C. according to ISO 178 of 150 MPa or more.

12 Claims, 4 Drawing Sheets

(51) Int. Cl.
*B60C 7/14* (2006.01)
*B60C 11/00* (2006.01)

(56) References Cited

U.S. PATENT DOCUMENTS

| | | | |
|---|---|---|---|
| 10,011,146 | B2 | 7/2018 | Fudemoto et al. |
| 10,493,807 | B2 | 12/2019 | Kouno et al. |
| 10,533,078 | B2 | 1/2020 | Kim |
| 2011/0104428 | A1 | 5/2011 | Delfino et al. |
| 2015/0246577 | A1 | 9/2015 | Fudemoto et al. |
| 2015/0251492 | A1* | 9/2015 | Fudemoto ............ B60C 7/24 152/80 |
| 2015/0258853 | A1 | 9/2015 | Fudemoto et al. |
| 2015/0273945 | A1* | 10/2015 | Fudemoto ............ B60C 7/10 152/318 |
| 2017/0120681 | A1 | 5/2017 | Toyosawa |
| 2018/0001699 | A1 | 1/2018 | Shoji |
| 2018/0056720 | A1* | 3/2018 | Abe ............ B60C 7/00 |

FOREIGN PATENT DOCUMENTS

| | | |
|---|---|---|
| CN | 105415981 A | 3/2016 |
| CN | 105452014 A | 3/2016 |
| CN | 105620204 A | 6/2016 |
| EP | 2 889 158 A1 | 7/2015 |
| EP | 2 896 510 A1 | 7/2015 |
| EP | 2 939 851 A1 | 11/2015 |
| EP | 3 061 624 A1 | 8/2016 |
| EP | 3 156 257 A1 | 4/2017 |
| FR | 2 963 353 A1 | 2/2012 |
| JP | 2011-515261 A | 9/2011 |
| JP | 2012-46033 A | 3/2012 |
| JP | 2014-008791 A | 1/2014 |
| JP | 2014-125081 A | 7/2014 |
| JP | 2015-113017 A | 6/2015 |
| JP | 2015-171886 A | 10/2015 |
| JP | 2017-13681 A | 1/2017 |
| WO | 2010/005056 A1 | 1/2010 |
| WO | 2015/175804 A1 | 11/2015 |
| WO | 2015/194087 A1 | 12/2015 |
| WO | 2016/052984 A1 | 4/2016 |
| WO | 2016/114167 A1 | 7/2016 |
| WO | 2017/106704 A2 | 6/2017 |

OTHER PUBLICATIONS

Chinese Search Report dated Aug. 26, 2021 by the Chinese Patent Office in Chinese Application No. 201880072760.X.

"ABS Resin "Toyolac" Technical Guide", XP055805100, Dec. 8, 2005, Retrieved from URL: https://ww.torayplastics.com.my/pdf/toyolac/Technical_guide/GP_Technical_Guide.pdf on May 18, 2021, 17 pages.

"TORAY Amilan CM1007", XP055805110, May 18, 2021, Retrieved from URL: https://product.toray.com/en-plastics/detail.x?uriNo=1001 on May 18, 2021, 2 pages.

Communication dated May 27, 2021 by the European Patent Office in application No. 18877086.1.

International Preliminary Report on Patentability with the translation of Written Opinion dated May 12, 2020, from the International Bureau in International Application No. PCT/JP2018/040614.

* cited by examiner

NONPNEUMATIC TIRE

TECHNICAL FIELD

The present disclosure relates to a non-pneumatic tire.

BACKGROUND

In recent years, in order to avoid the occurrence of a puncture, a tire that does not need to be internally filled with pressurized air has been proposed.

For example, Patent Literature 1 below discloses a non-pneumatic tire comprising an attachment body attached to an axle, a ring member including an inner rim fitted onto the attachment body and an outer rim configured to surround the inner rim from the outside in a tire radial direction, and a plurality of connecting members disposed between the inner rim and the outer rim in a tire circumferential direction and configured to connect the inner rim and the outer rim to each other in a relatively elastically displaceable manner.

Patent Literature 1 below further discloses that the ride comfort can be improved by integrally forming the ring member and the connecting members of the non-pneumatic tire with a synthetic resin material having a predetermined ratio between the bending modulus of elasticity at −20° C. and the bending modulus of elasticity at 60° C.

CITATION LIST

Patent Literature

PTL 1: Japanese Patent Laid-Open No. 2014-125081

SUMMARY

Technical Problem

However, the present inventor has studied and found that the non-pneumatic tire disclosed in Patent Literature 1 has a large temperature dependence of ride comfort, and there is room for improvement in ride comfort especially at low temperatures.

In addition, from the viewpoint of safety, the above-mentioned non-pneumatic tire including a ring member and connecting members formed of synthetic resin material also requires high durability.

It is therefore an object of the present disclosure to provide a non-pneumatic tire having a small temperature dependence of ride comfort, providing a good ride comfort over a wide temperature range, and having an excellent durability, which solves the problems in the related art.

Solution to Problem

The main features of the present disclosure for solving the above problem are as follows.

The non-pneumatic tire of the present disclosure is a non-pneumatic tire using a resin composition for a framework member, in which the resin composition has a bending modulus of elasticity at −20° C. according to ISO 178 of 1600 MPa or less, and a bending modulus of elasticity at 60° C. according to ISO 178 of 150 MPa or more.

Such a non-pneumatic tire of the present disclosure has a small temperature dependence of ride comfort, provides a good ride comfort over a wide temperature range, and has an excellent durability.

Here, in the present disclosure, the bending modulus of elasticity is a value obtained by a three-point bending test according to "ISO 178: 2010 Method A".

In a preferred example of the non-pneumatic tire of the present disclosure, the resin composition contains a thermoplastic elastomer (A) having a hard segment and a soft segment in a molecule thereof, and a resin (B) of the same kind as the hard segment other than the thermoplastic elastomer (A). In this case, the temperature dependence of the ride comfort is further reduced, the ride comfort is improved over a wide temperature range, and the durability is further improved.

Here, the term "thermoplastic elastomer" refers to a thermoplastic resin material having a hard segment and a soft segment in a molecule thereof, and more specifically, refers to a thermoplastic resin material which is a macromolecular compound having elasticity and formed of a copolymer having a polymer constituting a crystalline hard segment having a high melting point and a polymer constituting an amorphous soft segment having a low glass transition temperature.

The "resin of the same kind" as the hard segment included in the thermoplastic elastomer refers to a resin having a skeleton that is common with the skeleton constituting the main chain of the hard segment included in the thermoplastic elastomer. The resin (B) in the present disclosure means a resin having a thermoplastic property or thermosetting property, and does not include vulcanized rubber such as natural rubber and synthetic rubber. The thermoplastic elastomer (A) also does not include vulcanized rubber such as natural rubber or synthetic rubber.

The thermoplastic elastomer (A) is preferably a polyester-based thermoplastic elastomer and the resin (B) is preferably a polyester resin. In this case, the ride comfort is further improved over a wide temperature range, the durability is further improved, and further, a non-pneumatic tire can be manufactured at low cost.

It is more preferable that the hard segment of the polyester-based thermoplastic elastomer be polybutylene terephthalate and the polyester resin be polybutylene terephthalate. In this case, the ride comfort is particularly good.

In another preferred example of the non-pneumatic tire of the present disclosure, the mass ratio of the thermoplastic elastomer (A) to the resin (B), A/B, is 60/40 to 40/60. In this case, the balance between durability and ride comfort is particularly excellent.

In an embodiment of the present disclosure, the non-pneumatic tire is a non-pneumatic tire including a wheel portion to be attached to an axle, an inner cylinder externally covering the wheel portion, an outer cylinder surrounding the inner cylinder from an outside in a tire radial direction, a plurality of connecting members arranged along a tire circumferential direction between the inner cylinder and the outer cylinder and connecting the inner cylinder and the outer cylinder to each other, and a tread member provided outside the outer cylinder in the tire radial direction, in which the inner cylinder, the outer cylinder, and the connecting members as the framework member are formed of the resin composition. In this case as well, a non-pneumatic tire having a small temperature dependence of ride comfort, providing a good ride comfort over a wide temperature range, and having an excellent durability can be obtained.

Advantageous Effect

According to the present disclosure, it is possible to provide a non-pneumatic tire having a small temperature dependence of ride comfort, providing a good ride comfort over a wide temperature range, and having an excellent durability.

DETAILED DESCRIPTION

Figure 1:
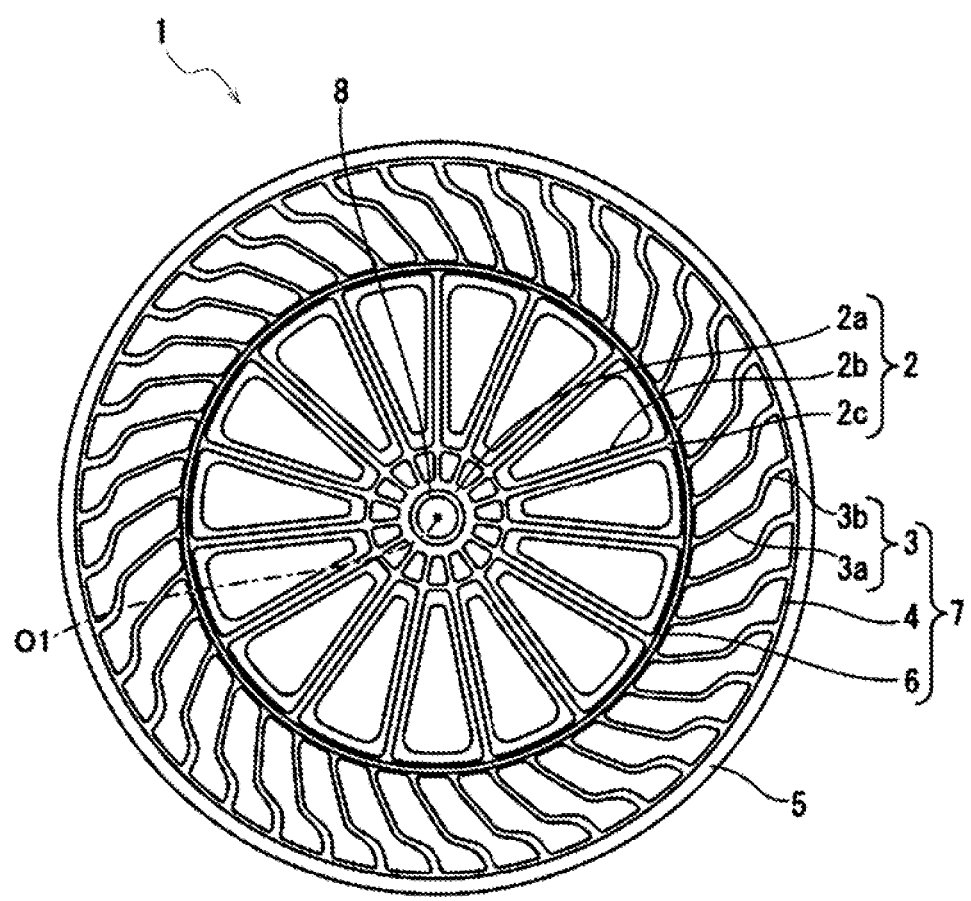
FIG. 1 is a view schematically illustrating a configuration of a non-pneumatic tire according to an embodiment of the present disclosure as viewed from a side surface of the tire.

The non-pneumatic tire of the present disclosure will be illustratively described below in detail based on embodiments thereof.

The non-pneumatic tire of the present disclosure is a non-pneumatic tire using a resin composition for a framework member.

Here, the framework member of the non-pneumatic tire is a member constituting the tire framework. More specifically, the framework member is a member that supports a tread member from the inside toward the outside of the tire in order to maintain the shape of the tire tread. For example, the framework member refers to a ring member (an inner cylinder, an outer cylinder), and connecting members (a spoked structure) or the like in a non-pneumatic tire.

In the non-pneumatic tire of the present disclosure, the resin composition used for a framework member has a bending modulus of elasticity at −20° C. according to ISO 178 of 1600 MPa or less, and a bending modulus of elasticity at 60° C. according to ISO 178 of 150 MPa or more.

The bending modulus of elasticity of the resin composition generally tends to decrease as the temperature increases, but when the bending modulus of elasticity of the resin composition used for a framework member at 60° C. is 150 MPa or more, the framework member does not become too soft even at a relatively high temperature, and when, for example, a bicycle equipped with the non-pneumatic tire is pedaled, the pedaling does not become heavy, the ride comfort is good, and the durability can be sufficiently secured. The bending modulus of elasticity of the resin composition generally tends to increase as the temperature decreases, but when the bending modulus of elasticity of the resin composition used for a framework member at −20° C. is 1600 MPa or less, the framework member does not become too hard even at a relatively low temperature, so that the ride comfort is good, the framework member does not become too hard and brittle, and the durability is excellent. Therefore, the non-pneumatic tire of the present disclosure has a small temperature dependence of ride comfort, provides a good ride comfort over a wide temperature range, and has an excellent durability.

The bending modulus of elasticity at −20° C. of the resin composition used for a framework member is 1600 MPa or less, preferably 1500 MPa or less, more preferably 1400 MPa or less, and is usually 150 MPa or more, preferably 600 MPa or more, more preferably 900 MPa or more. When the bending modulus of elasticity at −20° C. exceeds 1600 MPa, the framework member becomes too hard, the vibration transmitted from the tire is intensified to deteriorate the ride comfort, and the framework member becomes too hard and brittle to deteriorate the durability. When the bending modulus of elasticity at −20° C. is 600 MPa or more, the ride comfort and durability in a low-temperature environment are improved in a well-balanced manner.

The bending modulus of elasticity at 60° C. of the resin composition used for a framework member is 150 MPa or more, preferably 160 MPa or more, more preferably 170 MPa or more, and is usually 1600 MPa or less, preferably 600 MPa or less, more preferably 500 MPa or less. When the bending modulus of elasticity at 60° C. is less than 150 MPa, the framework member becomes too soft, and when, for example, a bicycle equipped with a non-pneumatic tire is pedaled, the pedaling becomes heavy, and the ride comfort may deteriorate, and the durability may deteriorate. Further, when the bending modulus of elasticity at 60° C. is 600 MPa or less, the ride comfort and durability in a high-temperature environment are improved in a well-balanced manner.

The bending modulus of elasticity at 0° C. of the resin composition used for a framework member is usually 150 MPa or more, preferably 500 MPa or more, more preferably 700 MPa or more, and is usually 1600 MPa or less, preferably 1400 MPa or less, more preferably 1200 MPa or less. When the bending modulus of elasticity at 0° C. is 500 MPa or more, the ride comfort in a low-temperature environment is further improved, and when the bending modulus of elasticity at 0° C. is 1400 MPa or less, the ride comfort and the durability in a low-temperature environment are improved in a well-balanced manner.

The bending modulus of elasticity at 23° C. of the resin composition used for a framework member is usually 150 MPa or more, preferably 300 MPa or more, more preferably 400 MPa or more, and usually 1600 MPa or less, preferably 1200 MPa or less, more preferably 1000 MPa or less. When the bending modulus of elasticity at 23° C. is 300 MPa or more, the ride comfort at room temperature is further improved, and when the bending modulus of elasticity at 23° C. is 1200 MPa or less, the ride comfort and the durability at room temperature are improved in a well-balanced manner.

The bending modulus of elasticity at 40° C. of the resin composition used for a framework member is usually 150 MPa or more, preferably 180 MPa or more, more preferably 250 MPa or more, and usually 1600 MPa or less, preferably 800 MPa or less, more preferably 600 MPa or less. When the bending modulus of elasticity at 40° C. is 180 MPa or more, the ride comfort in a high-temperature environment is further improved, and when the bending modulus of elasticity at 40° C. is 800 MPa or less, the ride comfort and the durability in a high-temperature environment are improved in a well-balanced manner.

The resin component of the resin composition used for a framework member is preferably a thermoplastic resin or a thermoplastic elastomer. Various additives may be added to the resin composition in addition to the resin component.

Here, the thermoplastic resin and the thermoplastic elastomer are macromolecular compounds which soften and flow with an increase in temperature and become relatively hard and strong when cooled, and in the present description, a macromolecular compound which softens and flows with an increase in temperature and becomes relatively hard and strong when cooled and has rubber-like elasticity is distinguished as the thermoplastic elastomer, and a macromolecular compound which softens and flows with an increase in temperature and becomes relatively hard and strong when cooled and does not have rubber-like elasticity is distinguished as the thermoplastic resin.

Examples of the thermoplastic resin include polyester resins, polyamide resins, polyolefin resins, and polystyrene resins. Among these, polyester resins are preferred from the viewpoint of durability and cost.

The polyester resin is a resin having an ester bond in the main chain. The polyester resin is not particularly limited, and is preferably a crystalline polyester. As the crystalline polyester, an aromatic polyester may be used. The aromatic polyester may be formed, for example, from an aromatic dicarboxylic acid or an ester-forming derivative thereof and an aliphatic diol.

Examples of the aromatic polyester include polyethylene terephthalate, polybutylene terephthalate, polystyrene terephthalate, polyethylene naphthalate, and polybutylene naphthalate, and polybutylene terephthalate is preferred.

Examples of the aromatic polyester include polybutylene terephthalate derived from terephthalic acid and/or dimethyl terephthalate and 1,4-butanediol, and further include polyesters derived from dicarboxylic acid components such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof, and diols having a molecular weight of 300 or less {for example, aliphatic diols such as ethylene glycol, trimethylene glycol, pentamethylene glycol, hexamethylene glycol, neopentyl glycol, and decamethylene glycol, alicyclic diols such as 1,4-cyclohexane dimethanol and tricyclodecane dimethylol, aromatic diols such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, and 4,4'-dihydroxy-p-quarterphenyl}, or copolymerized polyesters in which two or more of these dicarboxylic acid components and diol components are used in combination. It is also possible to copolymerize a trifunctional or higher polyfunctional carboxylic acid component, a polyfunctional oxyacid component, a polyfunctional hydroxy component and the like in an amount of 5 mol % or less.

As the polyester resin, commercially available products may be used, and examples thereof include "DURANEX" series (for example, 2000, 2002, etc.) manufactured by Polyplastics Co., Ltd., NOVADURAN series (for example, 5010R5, 5010R3-2, etc.) manufactured by Mitsubishi Engineering-Plastics Corporation, "TORAYCON" series (for example, 1401X06, 1401X31, 1401X70, etc.) manufactured by Toray Industries, Inc., and "PLANAC" series (for example, BT-1000) manufactured by Toyobo Co., Ltd.

The polyamide resin is a resin having an amide bond (—NHCO—) in the main chain. Examples of the polyamide resin include aliphatic polyamide such as polycapramide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), and polydecamethylene adipamide (nylon-10,8), and crystalline aromatic polyamides obtained by polycondensation reaction of aromatic diamines such as metaxylenediamine and paraxylenediamine with dicarboxylic acids such as adipic acid, suberic acid, sebacic acid, cyclohexanedicarboxylic acid, terephthalic acid, and isophthalic acid, or derivatives thereof. Among these, nylon-6, nylon-6,6, nylon-12 and the like are preferred, and nylon-12 is more preferred.

As the polyamide resin, commercially available products may be used, and examples thereof include UBESTA (for example, 3014U, 3020U, etc.) manufactured by Ube Industries, Ltd., and VESTAMID (for example, L1600, L1700, etc.) manufactured by Daicel-Evonik Ltd.

The polyolefin resin is a polymer whose main chain is formed from an olefin such as ethylene, propylene, and 1-butene. Examples of the polyolefin resin include polyethylene, polypropylene, polybutene, cycloolefin-based resins, and copolymers of these resins. Among these, polyethylene, polypropylene, and ethylene-propylene copolymer are preferred, and polypropylene and ethylene-propylene copolymer are more preferred.

As the polyolefin resin, commercially available products may be used, for example, PRIME PP® (PRIME PP is a registered trademark in Japan, other countries, or both) manufactured by Prime Polymer Co., Ltd., and NOVATEC PP® (NOVATEC PP is a registered trademark in Japan, other countries, or both) and WINTECH® (WINTECH is a registered trademark in Japan, other countries, or both) manufactured by Nippon Polypropylene Corporation.

The polystyrene resin is a polymer of styrene. As the polystyrene resin, commercially available products may be used, for example, XAREC® (XAREC is a registered trademark in Japan, other countries, or both) manufactured by Idemitsu Kosan Co., Ltd., TOYO STYROL® (TOYO STYROL is a registered trademark in Japan, other countries, or both) manufactured by Toyo Styrene Co., Ltd., and CEVIAN manufactured by Daicel Polymer Ltd.

Examples of the thermoplastic elastomer include a polyester-based thermoplastic elastomer (TPC), a polyamide-based thermoplastic elastomer (TPA), a polyolefin-based thermoplastic elastomer (TPO), and a polystyrene-based thermoplastic elastomer (TPS). Among these, polyester-based thermoplastic elastomer (TPC) is preferred from the viewpoint of durability and cost.

The polyester-based thermoplastic elastomer (TPC) is a macromolecular compound having elasticity, and is a thermoplastic resin material formed of a copolymer having a polymer constituting the crystalline hard segment having a high melting point and a polymer constituting the amorphous soft segment having a low glass transition temperature, wherein the main chain of the polymer constituting the hard segment has an ester bond.

As the crystalline polyester forming the hard segment of the polyester-based thermoplastic elastomer (TPC), an aromatic polyester may be used. The aromatic polyester may be formed, for example, from an aromatic dicarboxylic acid or an ester-forming derivative thereof and an aliphatic diol. Examples of the aromatic polyester forming the hard segment include polyethylene terephthalate, polybutylene terephthalate, polystyrene terephthalate, polyethylene naphthalate, and polybutylene naphthalate, and polybutylene terephthalate is preferred.

Suitable examples of the aromatic polyester forming the hard segment include polybutylene terephthalate derived from terephthalic acid and/or dimethyl terephthalate and 1,4-butanediol, and further include polyesters derived from dicarboxylic acid components such as isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof, and diol components such as ethylene glycol, trimethylene glycol, pentamethylene glycol, hexamethylene glycol, neopentyl glycol, decamethylene glycol, 1,4-cyclohexane dimethanol, tricyclodecane dimethylol, xylylene glycol, bis(p-hydroxy)diphenyl, bis(p-hydroxyphenyl)propane, 2,2-bis[4-(2-hydroxyethoxy) phenyl]propane, bis[4-(2-hydroxy)phenyl]sulfone, 1,1-bis [4-(2-hydroxyethoxy)phenyl]cyclohexane, 4,4'-dihydroxy-p-terphenyl, and 4,4'-dihydroxy-p-quarterphenyl, or copolymerized polyesters in which two or more of these dicarboxylic acid components and diol components are used in combination.

Examples of the polymer forming the soft segment of the polyester-based thermoplastic elastomer (TPC) include a polymer selected from aliphatic polyethers and aliphatic polyesters.

Examples of the aliphatic polyether include poly(ethylene oxide)glycol, poly(propylene oxide)glycol, poly(tetramethylene oxide)glycol, poly(hexamethylene oxide)glycol, copolymers of ethylene oxide and propylene oxide, ethylene oxide addition polymers of poly(propylene oxide)glycol, and copolymers of ethylene oxide and tetrahydrofuran.

Examples of the aliphatic polyester include poly(ε-caprolactone), polyenantholactone, polycaprylolactone, polybutylene adipate, and polyethylene adipate.

Among these aliphatic polyethers and aliphatic polyesters, from the viewpoint of the elastic properties of the copolymer to be obtained, poly(tetramethylene oxide)glycol, ethylene oxide addition polymers of poly(propylene oxide)glycol, poly(ε-caprolactone), polybutylene adipate, polyethylene adipate and the like are preferred.

The polyester-based thermoplastic elastomer may be synthesized by copolymerizing a polymer forming the hard segment and a polymer forming the soft segment by a known method. As the polyester-based thermoplastic elastomer, commercially available products may be used, and examples thereof include "HYTREL" series manufactured by Du Pont-Toray Co., Ltd. (for example, 3046, 5557, 5577, 5577R-07, 6347, 4047, 4767, 4767N, 4777, etc.), and "PELPRENE" series (P30B, P40B, P40H, P55B, P70B, P90B, P150B, P280B, P450B, P150M, S1001, S2001, S5001, S6001, S9001, etc.) manufactured by Toyobo Co., Ltd.

The polyamide-based thermoplastic elastomer (TPA) is a macromolecular compound having elasticity, and is a thermoplastic resin material formed of a copolymer having a polymer constituting the crystalline hard segment having a high melting point and a polymer constituting the amorphous soft segment having a low glass transition temperature, wherein the main chain of the polymer constituting the hard segment has an amide bond (—CONH—).

Examples of the polyamide-based thermoplastic elastomer include a material in which at least polyamide constitutes the crystalline hard segment having a high melting point and another polymer (for example, polyester, polyether, etc.) constitutes the amorphous soft segment having a low glass transition temperature.

Examples of the crystalline polyamide constituting the hard segment of the polyamide-based thermoplastic elastomer (TPA) include aliphatic polyamide such as polycapramide (nylon-6), poly-ω-aminoheptanoic acid (nylon-7), poly-ω-aminononanoic acid (nylon-9), polyundecaneamide (nylon-11), polylauryl lactam (nylon-12), polyethylene diamine adipamide (nylon-2,6), polytetramethylene adipamide (nylon-4,6), polyhexamethylene adipamide (nylon-6, 6), polyhexamethylene sebacamide (nylon-6,10), polyhexamethylene dodecamide (nylon-6,12), polyoctamethylene adipamide (nylon-8,6), and polydecamethylene adipamide (nylon-10,8), and crystalline aromatic polyamides obtained by polycondensation reaction of aromatic diamines such as metaxylenediamine and paraxylenediamine with dicarboxylic acids such as adipic acid, suberic acid, sebacic acid, cyclohexanedicarboxylic acid, terephthalic acid, and isophthalic acid, or derivatives thereof. Among these, nylon-6, nylon-6,6, nylon-12 and the like are preferred, and nylon-12 is more preferred.

Examples of the polymer constituting the soft segment of the polyamide-based thermoplastic elastomer (TPA) include a polymer selected from polymethylenes and aliphatic polyethers.

Examples of the aliphatic polyether include poly(ethylene oxide)glycol, poly(propylene oxide)glycol, poly(tetramethylene oxide)glycol, poly(hexamethylene oxide)glycol, copolymers of ethylene oxide and propylene oxide, ethylene oxide addition polymers of poly(propylene oxide)glycol, and copolymers of ethylene oxide and tetrahydrofuran.

The polyamide-based thermoplastic elastomer may be synthesized by copolymerizing a polymer forming the hard segment and a polymer forming the soft segment by a known method. As the polyamide-based thermoplastic elastomer, commercially available products may be used, and examples thereof include "UBESTA XPA" series (for example, XPA9063X1, XPA9055X1, XPA9048X2, XPA9048X1, XPA9040X1, XPA9040X2, XPA9044, XPA9048, XPA9055, etc.) manufactured by Ube Industries, Ltd. and the "VESTAMIDE" series (for example, E40-S3, E47-S1, E47-S3, E55-S1, E55-S3, EX9200, E50-R2) manufactured by Daicel-Evonik Ltd.

The polyolefin-based thermoplastic elastomer (TPO) is a macromolecular compound having elasticity, and is a thermoplastic resin material formed of a copolymer having a polymer constituting the crystalline hard segment having a high melting point and a polymer constituting the amorphous soft segment having a low glass transition temperature, wherein the polymer constituting the hard segment is a polyolefin such as polypropylene or polyethylene.

Examples of the polyolefin-based thermoplastic elastomer include a material in which at least polyolefin constitutes the crystalline hard segment having a high melting point, and the polyolefin and an olefin other than the polyolefin constitute the amorphous soft segment having a low glass transition temperature.

Examples of the polyolefin forming the hard segment of the polyolefin-based thermoplastic elastomer include polypropylene, isotactic polypropylene, polyethylene, and poly-1-butene.

Examples of the polymer constituting the soft segment of the polyolefin-based thermoplastic elastomer include ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, and 1-butene-4-methyl-pentene.

The polyolefin-based thermoplastic elastomer may be synthesized by copolymerizing a polymer constituting the hard segment and a polymer constituting the soft segment by a known method. As the polyolefin-based thermoplastic elastomer, commercially available products may be used, for example, PRIME TPO® (PRIME TPO is a registered trademark in Japan, other countries, or both) manufactured by Prime Polymer Co., Ltd., and TAFMER® (TAFMER is a registered trademark in Japan, other countries, or both) and NOTIO® (NOTIO is a registered trademark in Japan, other countries, or both) manufactured by Mitsui Chemicals, Inc.

The polystyrene-based thermoplastic elastomer (TPS) is a macromolecular compound having elasticity, and is a thermoplastic resin material formed of a copolymer having a polymer constituting the hard segment and a polymer constituting the amorphous soft segment having a low glass transition temperature, wherein the polymer constituting the hard segment is polystyrene or a polystyrene derivative.

Examples of the polystyrene-based thermoplastic elastomer include, but are not particularly limited to, copolymers in which polystyrene constitutes the hard segment and an amorphous polymer constitutes the soft segment having a low glass transition temperature (for example, polyethylene, polybutadiene, polyisoprene, hydrogenated polybutadiene, hydrogenated polyisoprene, poly(2,3-dimethyl-butadiene), etc.).

The polystyrene-based thermoplastic elastomer may be synthesized by copolymerizing a polymer constituting the hard segment and a polymer constituting the soft segment by a known method such as block copolymerization. As the polystyrene-based thermoplastic elastomer, commercially available products may be used, for example, TUFPRENE® (TUFPRENE is a registered trademark in Japan, other countries, or both) and TUFTEC® (TUFTEC is a registered trademark in Japan, other countries, or both) manufactured by Asahi Kasei Corporation, SEPTON® (SEPTON is a registered trademark in Japan, other countries, or both) manufactured by Kuraray Co., Ltd.

In the non-pneumatic tire of the present disclosure, the resin composition preferably contains a thermoplastic elastomer (A) having a hard segment and a soft segment in a molecule thereof, and a resin (B) of the same kind as the hard segment other than the thermoplastic elastomer (A). The thermoplastic elastomer (A) having a hard segment and a soft segment in a molecule thereof and the resin (B) other than the thermoplastic elastomer (A) and of the same kind as the hard segment have an excellent compatibility, and with a non-pneumatic tire using such a resin composition for a framework member, the temperature dependence of the ride comfort is further reduced, the ride comfort is improved over a wide temperature range, and the durability is further improved.

The thermoplastic elastomer (A) is preferably a polyester-based thermoplastic elastomer and the resin (B) is preferably a polyester resin. Since the polyester-based thermoplastic elastomer and the polyester resin have a better compatibility, the ride comfort is further improved over a wide temperature range and the durability is further improved in the non-pneumatic tire using a resin composition containing a polyester-based thermoplastic elastomer and a polyester resin for a framework member. Since the polyester resin can be manufactured in a large amount and is inexpensive, the non-pneumatic tire can be manufactured at a low cost.

It is more preferable that the hard segment of the polyester-based thermoplastic elastomer be polybutylene terephthalate and the polyester resin be polybutylene terephthalate. The resin composition containing a polyester-based thermoplastic elastomer whose hard segment is polybutylene terephthalate, and polybutylene terephthalate has high strength, and the non-pneumatic tire using such a resin composition for a framework member has a small deflection, and provides light pedaling and an especially good ride comfort.

In the resin composition used for a framework member, the mass ratio of the thermoplastic elastomer (A) to the resin (B), A/B, is preferably in the range of 60/40 to 40/60. When the mass ratio of the thermoplastic elastomer (A) to the resin (B), A/B, is in the range of 60/40 to 40/60, the hardness of the resin composition is appropriate, and the balance between durability and ride comfort becomes particularly excellent in a non-pneumatic tire using such a resin composition for a framework member.

The resin composition used for a framework member may contain an additive in addition to the resin components such as the thermoplastic resin and the thermoplastic elastomer described above. Examples of the additive to be added to the resin composition include a moisture and heat resistant additive, a weather-resistant antioxidant, a heat-resistant antioxidant, an antistatic agent, a lubricant, a crystal nucleating agent, a tackifier, an antifogging agent, a release agent, a plasticizer, a filler, a pigment, a dye, a fragrance, and a flame retardant, and among them, preferred are a moisture and heat resistant additive, a weather-resistant antioxidant, and a heat-resistant antioxidant. By adding a moisture and heat resistant additive, a weather-resistant antioxidant, and a heat-resistant antioxidant to the resin composition, the stability of the resin composition is improved and thus the non-pneumatic tire using such a resin composition for a framework member can maintain desired characteristics over a long period of time. The total content of these additives is preferably 20 parts by mass or less, more preferably 10 parts by mass or less, per 100 parts by mass of the resin component.

The moisture and heat resistant additive is an additive having an action of improving the moisture and heat resistance of the resin composition, and as the moisture and heat resistant additive, carbodiimide compounds and epoxy compounds are preferred, and epoxy compounds are more preferred.

The carbodiimide compound may specifically be any compound having one or more carbodiimide groups in the molecule, and examples thereof include monofunctional carbodiimide compounds such as N,N'-diisopropylcarbodiimide, N,N'-di(o-toluyl)carbodiimide, N,N'-dicyclohexylcarbodiimide, N,N'-bis(2,6-diisopropylphenyl)carbodiimide; bifunctional carbodiimide compounds such as p-phenylene-bis(2,6-xylylcarbodiimide), p-phenylene-bis(t-butylcarbodiimide), p-phenylene-bis(mesitylcarbodiimide), tetramethylene-bis(t-butylcarbodiimide), cyclohexane-1,4-bis(methylene-t-butylcarbodiimide); polyfunctional carbodiimide compounds such as condensates of isocyanate monomers, among which polyfunctional carbodiimide compounds are preferred. Here, the polyfunctional carbodiimide compound refers to a compound having two or more carbodiimide groups. Examples of the polyfunctional carbodiimide compound include polyfunctional carbodiimide compounds generally known by trade names such as CARBODILITE LA-1 (manufactured by Nisshinbo), CARBODILITE HMV-8CA (manufactured by Nisshinbo), CARBODILITE HMV-15CA (manufactured by Nisshinbo), ELASTOSTAB H01 (manufactured by Nisshinbo), and Stabaxol P (manufactured by RheinChemie). One or more of these carbodiimide compounds may be used.

Specific examples of the epoxy compound include epoxidized soybean oil, epoxidized linseed oil, phenyl glycidyl ether, allyl glycidyl ether, tert-butylphenyl glycidyl ether, and 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethylene oxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxytallate, epoxidized polybutadiene, 3,4-dimethyl-1,2-epoxycyclohexane, 3,5-dimethyl-1,2-epoxycyclohexane, 3-methyl-5-tert-butyl-1,2-epoxycyclohexane, octadecyl-2,2-dimethyl-3,4-epoxycyclohexyl carboxylate, n-butyl-2,2-dimethyl-3,4-epoxycyclohexyl carboxylate, cyclohexyl-2-methyl-3,4-epoxycyclohexyl carboxylate, n-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-tert-butyl-4,5-epoxytetrahydrophthalic anhydride, diethyl-4,5-epoxy-cis-1,2-cyclohexyl dicarboxylate, and di-n-butyl-3-tert-butyl-4,5-epoxy-cis-1,2-cyclohexyl dicarboxylate. One or more of these epoxy compounds may be used.

By adding a moisture and heat resistant additive to the resin composition, the moisture and heat resistance of the resin composition is improved and thus the non-pneumatic tire using such a resin composition for a framework member can maintain desired characteristics over a long period of time. The amount of the moisture and heat resistant additive to be added is preferably in the range of 1 to 15 parts by mass per 100 parts by mass of the resin component of the resin composition. When the moisture and heat resistant additive is added more than 15 parts by mass, the unreacted moisture and heat resistant additive may undergo phase separation, and the weld strength (in molding, the strength of the portion where the molten resin has joined and fused in the mold) may be decreased.

The weather-resistant antioxidant is an additive having an action of improving the weather resistance of the resin composition, and as the weather-resistant antioxidant, benzotriazole-based compounds and amine-based compounds (hindered amine-based compounds) are preferred.

Examples of the benzotriazole-based compound include 2-(2-hydroxy-5-tert-butylphenyl)-2H-benzotriazole, ester compound of benzenepropanoic acid and 3-(2H-benzotriazol-2-yl)-5-(1,1-dimethylethyl)-4-hydroxy (C7-9-branched and linear alkyl), a mixture of octyl 3-[3-tert-butyl-4-hydroxy-5-(5-chloro-2H-benzotriazol-2-yl)phenyl]propionate and 2-ethylhexyl 3-[3-tert-butyl-4-hydroxy-5-(5-chloro-2H-benzotriazol-2-yl)phenyl]propionate, 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)phenol, a reaction product of methyl-3-(3-(2H-benzotriazol-2-yl)-5-t-butyl-4-hydroxyphenyl) propionate/polyethylene glycol 300, 2-(2H-benzotriazol-2-yl)-p-cresol, 2-(2H-benzotriazol-2-yl)-4,6-bis(1-methyl-1-phenylethyl)phenol, 2-[5-chloro(2H)-benzotriazol-2-yl]-4-methyl-6-(tert-butyl)phenol, 2-(2H-benzotriazol-2-yl)-4,6-di-tert-pentylphenol, 2-(2H-benzotriazol-2-yl)-4-(1,1,3,3-tetramethylbutyl)phenol, 2,2'-methylene bis[6-(2H-benzotriazol-2-yl)-4-(1,1,3,3-tetramethylbutyl)phenol], 2-(2H-benzotriazol-2-yl)-6-dodecyl-4-methylphenol, 2-[2-hydroxy-3-(3,4,5,6-tetrahydrophthalimido-methyl)-5-methylphenyl]benzotriazole, and 2,2'-methylene bis[6-(benzotriazol-2-yl)-4-tert-octylphenol].

Examples of the amine-based compound include bis(1,2,2,6,6-pentamethyl-4-piperidinyl) [[3,5-bis(1,1-dimethylethyl)-4-hydroxyphenyl]methyl]butylmalonate, a mixture of bis(1,2,2,6,6-pentamethyl-4-piperidyl) sebacate and methyl 1,2,2,6,6-pentamethyl-4-piperidyl sebacate, bis(2,2,6,6-tetramethyl-4-piperidyl) sebacate, N,N'-bis(2,2,6,6-tetramethyl-4-piperidyl)-N,N'-diformylhexamethylenediamine, poly[{6-(1,1,3,3-tetramethylbutyl)amino-1,3,5-triazine-2,4-diyl} {2,2,6,6-tetramethyl-4-piperidyl)imino} hexamethylene {(2,2,6,6-tetramethyl-4-piperidyl)imino}], tetrakis(1,2,2,6,6-pentamethyl-4-piperidyl)butane-1,2,3,4-tetracarboxylate, tetrakis(2,2,6,6-tetramethyl-4-piperidyl)butane-1,2,3,4-tetracarboxylate, a reaction product of 1,2,2,6,6-pentamethyl-4-piperidiol and β,β,β',β'-tetramethyl-2,4,8,10-tetraoxaspiro[5.5]undecane-3,9-diethanol, a reaction product of 2,2,6,6-tetramethyl-4-piperidiol and β,β,β',β'-tetramethyl-2,4,8,10-tetraoxaspiro[5.5]undecane-3,9-diethanol, bis(1-undecanoxy-2,2,6,6-tetramethylpiperidin-4-yl) carbonate, 1,2,2,6,6-pentamethyl-4-piperidyl methacrylate, and 2,2,6,6-tetramethyl-4-piperidyl methacrylate.

By adding a weather-resistant antioxidant to the resin composition, the weather resistance of the resin composition is improved and thus the non-pneumatic tire using such a resin composition for a framework member can maintain desired characteristics over a long period of time. The amount of the weather-resistant antioxidant to be added is preferably in the range of 1 to 5 parts by mass per 100 parts by mass of the resin component of the resin composition.

The heat-resistant antioxidant is an additive having an action of improving the heat resistance of the resin composition, and as the heat-resistant antioxidant, phenol-based compounds (hindered phenol-based compounds) are preferred. Examples of the phenol-based compound include 2,6-di-tert-butyl-4-methylphenol, n-octadecyl-3-(3,5-di-tert-butyl-4-hydroxyphenyl)propionate, tetrakis[methylene-3-(3,5-di-tert-butyl-4-hydroxyphenyl)propionate] methane, 2,4-di-tert-butyl-6-methylphenol, 1,6-hexanediol-bis-[3-(3,5-di-tert-butyl-4-hydroxyphenyl)propionate], tris(3,5-di-tert-butyl-4-hydroxybenzyl)-isocyanurate, 1,3,5-trimethyl-2,4,6-tris(3,5-di-tert-butyl-4-hydroxybenzyl)benzene, pentaerythritol tetrakis[3-(3,5-di-tert-butyl-4-hydroxyphenyl)propionate], 3,9-bis-[2-[3-(3-tert-butyl-4-hydroxy-5-methylphenyl)-propionyloxy]-1,1-dimethylethyl]-2,4,8,10-tetraoxaspiro[5.5]undecane, triethylene glycol-bis[3-(3-t-butyl-5-methyl)-4-hydroxyphenyl)propionate], 2,2'-butylidene bis(4,6-di-tert-butylphenol), 4,4'-butylidene bis(3-methyl-6-tert-butylphenol), 2,2'-methylene bis(4-methyl-6-tert-butylphenol), 2,2'-methylene bis(4-ethyl-6-tert-butylphenol), 2-tert-butyl-6-(3-tert-butyl-2-hydroxy-5-methylbenzyl)-4-methylphenol acrylate, 2-[1-(2-hydroxy-3,5-di-tert-pentylphenyl)pethyl]-4,6-di-tert-pentylphenyl acrylate, 4,4'-thiobis(3-methyl-6-tert-butylphenol), 2-tert-butyl-4-methylphenol, 2,4-di-tert-butylphenol, 2,4-di-tert-pentylphenol, 4,4'-thiobis(3-methyl-6-tert-butylphenol), 4,4'-butylidene bis(3-methyl-6-tert-butylphenol), bis-[3,3-bis-(4'-hydroxy-3'-tert-butylphenyl)-butanoic acid]-glycol ester, and N,N'-hexamethylene bis[3-(3,5-di-tert-butyl-4-hydroxyphenyl)propanamide].

By adding a heat-resistant antioxidant to the resin composition, the heat resistance of the resin composition is improved and thus the non-pneumatic tire using such a resin composition for a framework member can maintain desired characteristics over a long period of time. The amount of the heat-resistant antioxidant to be added is preferably in the range of 1 to 5 parts by mass per 100 parts by mass of the resin component of the resin composition.

The bending modulus of elasticity at each temperature of the resin composition used for a framework member can be adjusted to a desired range by adjusting the type and the mixing ratio of the resin component to be used, and the type and the amount of the additive to be added.

The method for preparing the resin composition is not particularly limited, and the additive may be added after the resin components are mixed, or the resin components and the additive may be mixed at once, or a plurality of resin components to which an additive has been added in advance may be mixed, or a resin component to which an additive has been added and a resin component to which no additive has been added may be mixed.

The resin composition may be processed into a framework member having a desired shape, using various molding methods. Here, as a molding method, injection molding is preferable.

Next, a configuration of a non-pneumatic tire according to an embodiment of the present disclosure will be described.

FIG. 1 is a view schematically illustrating a configuration of a non-pneumatic tire according to an embodiment of the present disclosure as viewed from a side surface of the tire. In each drawing used in the following description, the scale is appropriately changed to make each member have a recognizable size.

As illustrated in FIG. 1, the non-pneumatic tire 1 includes a wheel portion 2 attached to an axle and a tire portion 7 arranged on the outer circumference of the wheel portion 2.

The non-pneumatic tire 1 is used for bicycles, two-wheeled vehicles, wheelchairs, golf carts, automobiles, or the like (hereinafter, these generic names are simply referred to as vehicles).

Here, the wheel portion 2 is formed in a disk shape, the tire portion 7 is formed in an annular shape, and each central axis is located on a common axis. This common axis is referred to as the "central axis O1", and a direction along the central axis O1 is referred to as the "tire width direction". Further, in a side view as viewed from the tire width direction, a rotating direction around the central axis O1 is referred to as the "tire circumferential direction", and a direction orthogonal to the central axis O1 is referred to as the "tire radial direction".

As illustrated in FIG. 1, the wheel portion 2 includes a cylindrical boss 8 extending in the tire width direction around the central axis O1, a holding cylindrical portion 2a fixed to an outer circumferential surface of the boss 8, an externally covering cylindrical portion 2c surrounding the holding cylindrical portion 2a from an outside in the tire radial direction, and a plurality of ribs 2b connecting the holding cylindrical portion 2a and the externally covering cylindrical portion 2c to each other.

In the present embodiment, the boss 8 is formed of aluminum. The boss 8 is rotatably supported by the axle such that the wheel portion 2 is attached to the axle. The boss 8 may be formed of a metal other than aluminum or a nonmetal. In the tire width direction, the width of the boss 8 is larger than the widths of the holding cylindrical portion 2a, the plurality of ribs 2b, and the externally covering cylindrical portion 2c.

The holding cylindrical portion 2a and the externally covering cylindrical portion 2c are each arranged coaxially with the boss 8. For example, the plurality of ribs 2b are arranged at equal intervals in the tire circumferential direction. The plurality of ribs 2b each extend radially around the boss 8.

In the present embodiment, the holding cylindrical portion 2a, the plurality of ribs 2b, and the externally covering cylindrical portion 2c are integrally formed of a thermoplastic resin. Accordingly, the wheel portion 2 can be molded on the boss 8 by injection molding, and is suitable for mass production.

Note that the boss 8, the holding cylindrical portion 2a, the plurality of ribs 2b, and the externally covering cylindrical portion 2c may each be formed separately. Additionally, the holding cylindrical portion 2a, the plurality of ribs 2b, and the externally covering cylindrical portion 2c may be formed of a material other than the thermoplastic resin.

The tire portion 7 includes an inner cylinder 6 externally covering the externally covering cylindrical portion 2c of the wheel portion 2, an outer cylinder 4 surrounding the inner cylinder 6 from an outside in the tire radial direction, and a plurality of elastically deformable connecting members 3 arranged along a tire circumferential direction between the inner cylinder 6 and the outer cylinder 4 and connecting the inner cylinder 6 and the outer cylinder 4 so in a relatively displaceable manner. A tread member 5 is fitted on the outer circumferential surface of the outer cylinder 4.

The inner cylinder 6 is attached to the axle via the wheel portion 2. The central axes of the inner cylinder 6 and the outer cylinder 4 are arranged coaxially with the central axis O1. The inner cylinder 6, the connecting members 3, and the outer cylinder 4 are arranged in a state in which the center portions in the tire width direction coincide with each other in the tire width direction.

In the present embodiment, the inner cylinder 6, the connecting members 3, and the outer cylinder 4 are integrally formed of a resin composition. Accordingly, the tire portion 7 can be molded by injection molding, and is suitable for mass production.

Note that the inner cylinder 6, the connecting members 3, and the outer cylinder 4 may each be formed separately.

The tire portion 7 and the wheel portion 2 may be integrally formed or may be formed separately. The holding cylindrical portion 2a, the plurality of ribs 2b, and the externally covering cylindrical portion 2c of the wheel portion 2 have the function of connecting the boss 8 and the tire portion 7, and the tire portion 7 has the function of absorbing vibration transmitted from the ground to the boss 8. The holding cylindrical portion 2a, the plurality of ribs 2b, and the externally covering cylindrical portion 2c of the wheel portion 2 and the tire portion 7 have different functions as such and thus may be formed of different materials.

The tread member 5 is formed of vulcanized rubber obtained by vulcanizing a rubber composition containing natural rubber or the like, or a thermoplastic material, for example. Examples of the thermoplastic material include thermoplastic resins such as polyurethane resin, olefin resin, vinyl chloride resin, and polyamide resin. From the viewpoint of wear resistance, it is preferable to form the tread member 5 from vulcanized rubber. In the present embodiment, an adhesion layer is located between the outer cylinder 4 of the ring member and the tread member 5 to mediate the bonding between the outer cylinder 4 and the tread member 5. A commercially available adhesive may be used for the adhesion layer. Examples thereof include, but are not limited to, cyanoacrylate-based adhesives and epoxy-based adhesives specifically, Aron Alpha EXTRA 2000 (manufactured by Toagosei Co., Ltd.).

The connecting members 3 are formed in a rectangular plate shape that is curved as a whole, with the front and rear surfaces facing the tire circumferential direction, and the side surfaces facing the tire width direction. The connecting members 3 are formed of an elastically deformable material, and connect the outer circumferential surface side of the inner cylinder 6 and the inner circumferential surface side of the outer cylinder 4 so as to be relatively elastically displaceable. The plurality of connecting members 3 are arranged at equal intervals in the tire circumferential direction.

The plurality of connecting members 3 each have an inner portion 3a connected to the inner cylinder 6 and an outer portion 3b connected to the outer cylinder 4. The inner portion 3a and the outer portion 3b are connected to each other at the center portion in the tire radial direction of the connecting member 3, and cross at an obtuse angle at the connecting portion in a side view. The thickness of the inner portion 3a in the tire circumferential direction is smaller than the thickness of the outer portion 3b in the tire circumferential direction. The thickness of the outer portion 3b in the tire circumferential direction is gradually increased toward outside in the tire radial direction.

In the non-pneumatic tire according to the present embodiment, the framework member corresponds to the inner cylinder 6, the outer cylinder 4, and the connecting members 3 of the non-pneumatic tire 1, and the inner cylinder 6, the outer cylinder 4, and the connecting members 3 are formed of the resin composition described above, that is, the resin composition having a bending modulus of elasticity at −20° C. according to ISO 178 of 1600 MPa or less, and a bending modulus of elasticity at 60° C. according to ISO 178 of 150 MPa or more.

By forming the inner cylinder 6, the outer cylinder 4, and the connecting members 3 from the resin composition described above, a non-pneumatic tire having a small temperature dependence of ride comfort, providing a good ride comfort over a wide temperature range, and having an excellent durability can be provided.

Next, a non-pneumatic tire according to another embodiment of the present disclosure will be described.

Figure 2:
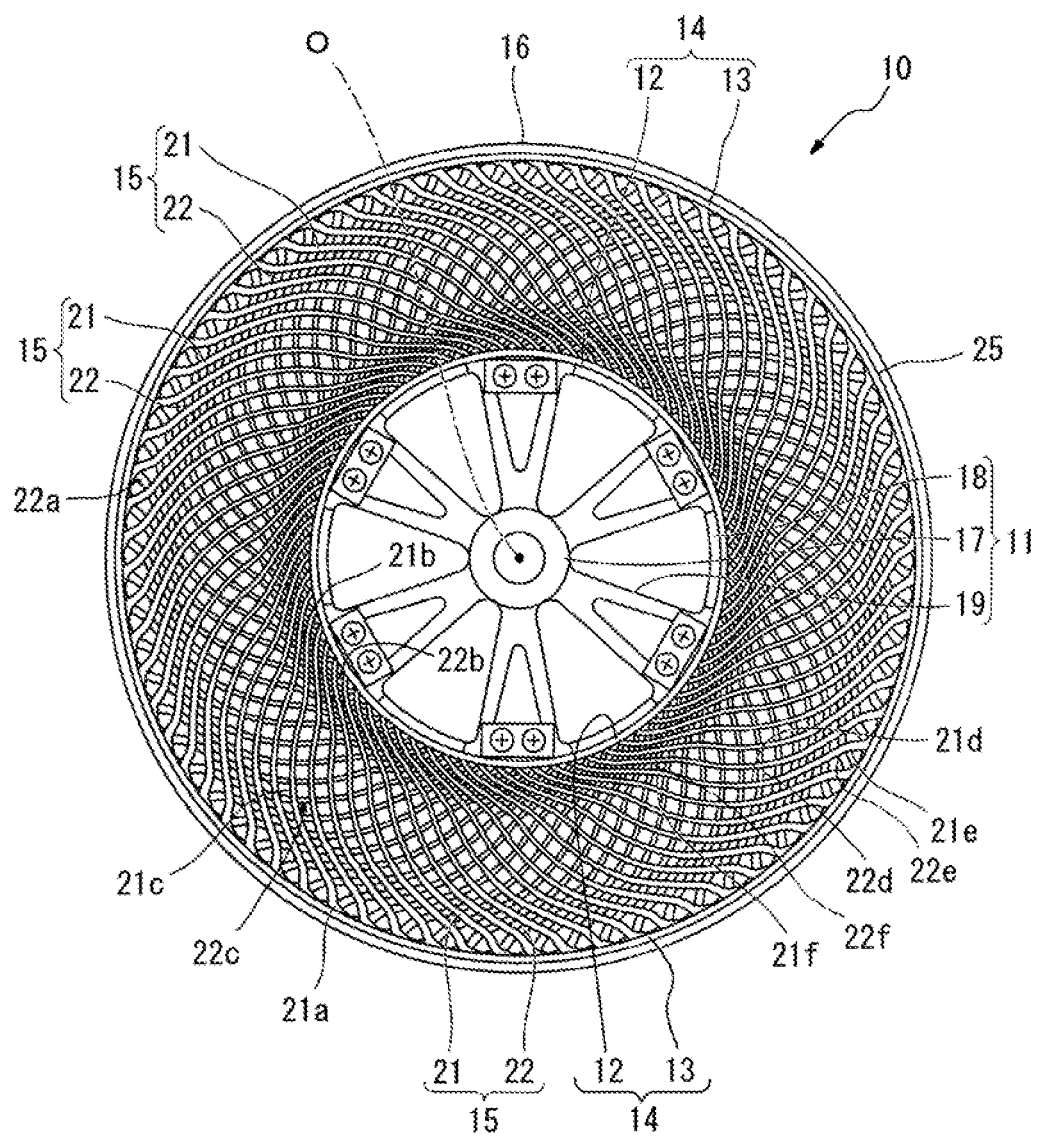
FIG. 2 is a view schematically illustrating a configuration of a non-pneumatic tire according to another embodiment of the present disclosure as viewed from a side surface of the tire.
Figure 3:
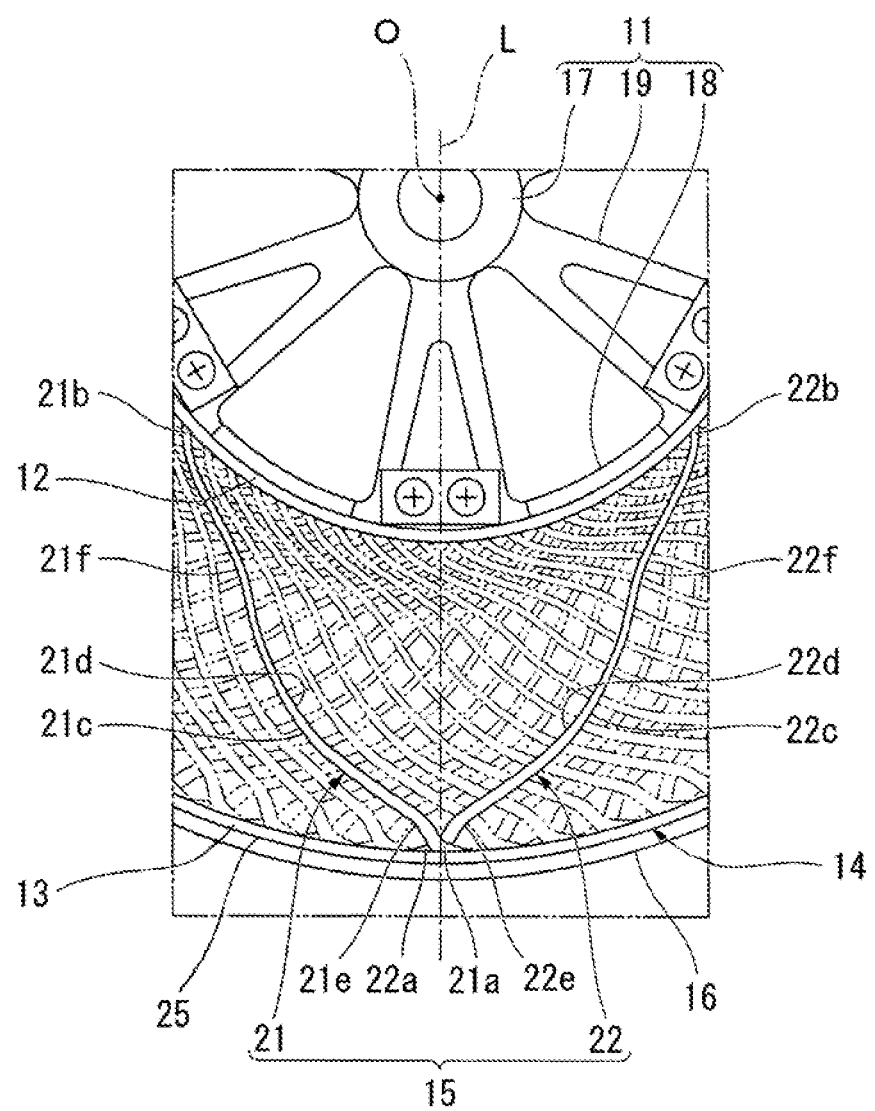
FIG. 3 is a view illustrating a portion of FIG. 2 in an enlarged manner.

FIG. 2 is a view schematically illustrating a configuration of a non-pneumatic tire according to another embodiment of the present disclosure as viewed from a side surface of the tire, and FIG. 3 is a view illustrating a portion of FIG. 2 in an enlarged manner. For the sake of clarity, in FIG. 3, only one first elastic connecting plate 21 and one second elastic connecting plate 22 of the below-described plurality of first elastic connecting plates 21 and plurality of second elastic connecting plates 22 are depicted with solid lines for emphasis.

As illustrated in FIGS. 2 and 3, a non-pneumatic tire 10 in the present embodiment includes a wheel portion 11 to be attached to an axle (not illustrated), a ring member 14 including an inner cylinder 12 externally covering the wheel portion 11 and an outer cylinder 13 surrounding the inner cylinder 12 from an outside in the tire radial direction, a plurality of connecting members 15 arranged along the tire circumferential direction between the inner cylinder 12 and the outer cylinder 13 and connecting the cylinders 12 and 13 to each other, and a tread member 16 provided outside the outer cylinder 13 in the tire radial direction. Here, the tread member 16 is formed of vulcanized rubber that integrally covers the outer circumference of the ring member 14.

The wheel portion 11, the inner cylinder 12, the outer cylinder 13, and the tread member 16 are arranged coaxially with a common axis and with their center portions in the tire width direction coinciding with each other. The common axis is referred to as the "axis line O", the direction along the axis line O as "tire width direction", the direction orthogonal to the axis line O as the "tire radial direction", and the rotating direction around the axis line O as the "tire circumferential direction".

The wheel portion 11 includes a holding cylindrical portion 17 in which an end of the axle is held, an outer ring portion 18 surrounding the holding cylindrical portion 17 from an outside in the tire radial direction, and a plurality of ribs 19 connecting the holding cylindrical portion 17 and the outer ring portion 18 (see FIGS. 2 and 3).

The holding cylindrical portion 17, the outer ring portion 18, and the ribs 19 are integrally formed of a metal material such as an aluminum alloy. The holding cylindrical portion 17 and the outer ring portion 18 are each formed to be cylindrical and are arranged coaxially with the axis line O. The plurality of ribs 19 are arranged at equal intervals in the circumferential direction.

Each connecting member 15 includes a first elastic connecting plate 21 and a second elastic connecting plate 22 connecting the inner cylinder 12 and the outer cylinder 13 in the ring member 14 to each other. A plurality of first elastic connecting plates 21 are arranged along the tire circumferential direction at one position in the tire width direction, and a plurality of second elastic connecting plates 22 are arranged along the tire circumferential direction at another position in the tire width direction different from the one position in the tire width direction. For example, a total of 60 first elastic connecting plates 21 and second elastic connecting plates 22 are provided.

In other words, the plurality of first elastic connecting plates 21 are arranged along the tire circumferential direction at the same position in the tire width direction, and the plurality of second elastic connecting plates 22 are arranged along the tire circumferential direction at the same position in the tire width direction away from the first elastic connecting plates 21 in the tire width direction.

The plurality of connecting members 15 are individually arranged at positions that are axisymmetric with respect to the axis line O, between the inner cylinder 12 and outer cylinder 13 in the ring member 14. All connecting members 15 have the same shape and the same size. The width of each connecting member 15 in the tire width direction is less than the width of the outer cylinder 13 in the tire width direction.

First elastic connecting plates 21 adjacent in the tire circumferential direction are not in contact with each other, and second elastic connecting plates 22 adjacent in the tire circumferential direction are not in contact with each other. Furthermore, a first elastic connecting plate 21 and a second elastic connecting plate 22 adjacent in the tire width direction are not in contact with each other.

The first elastic connecting plates 21 and the second elastic connecting plates 22 have the same width in the tire width direction. The first elastic connecting plates 21 and the second elastic connecting plates 22 also have the same thickness in a tire side view.

One end portions 21a of the first elastic connecting plates 21 connected to the outer cylinder 13 are located closer to one side in the tire circumferential direction than the other end portions 21b of the first elastic connecting plates 21 connected to the inner cylinder 12, and one end portions 22a of the second elastic connecting plates 22 connected to the outer cylinder 13 are located closer to the other side in the tire circumferential direction than the other end portions 22b of the second elastic connecting plates 22 connected to the inner cylinder 12.

The respective one end portions 21a and 22a of the first elastic connecting plates 21 and the second elastic connecting plates 22 are disposed at different positions in the tire width direction and connected at the same positions in the tire circumferential direction on the inner circumferential surface of the outer cylinder 13.

In the illustrated example, in the first elastic connecting plates 21 and the second elastic connecting plates 22, a plurality of curved portions 21*d* to 21*f* and 22*d* to 22*f*, respectively, curved in the tire circumferential direction are formed in intermediate portions 21*c* and 22*c*, respectively, located between the one end portions 21*a* and 22*a*, respectively, and the other end portions 21*b* and 22*b*, respectively, along extending directions of the elastic connecting plates 21 and 22, respectively, in a tire side view as the tire 10 is viewed from the tire width direction. In both the elastic connecting plates 21 and 22, of the plurality of curved portions 21*d* to 21*f* and 22*d* to 22*f*, respectively, curve directions of the curved portions 21*d* to 21*f* and 22*d* to 22*f*, respectively, adjacent to each other in the above-mentioned extending direction are opposite to each other.

The plurality of curved portions 21*d* to 21*f* formed in the first elastic connecting plates 21 have first curved portions 21*d* curved to protrude toward the other side in the tire circumferential direction, second curved portions 21*e* located between the first curved portions 21*d* and the one end portions 21*a* and curved to protrude toward the one side in the tire circumferential direction, and third curved portions 21*f* located between the first curved portions 21*d* and the other end portions 21*b* and curved to protrude toward the one side in the tire circumferential direction.

The plurality of curved portions 22*d* to 22*f* formed in the second elastic connecting plates 22 have first curved portions 22*d* curved to protrude toward the one side in the tire circumferential direction, second curved portions 22*e* located between the first curved portions 22*d* and the one end portions 22*a* and curved to protrude toward the other side in the tire circumferential direction, and third curved portions 22*f* located between the first curved portions 22*d* and the other end portions 22*b* and curved to protrude toward the other side in the tire circumferential direction.

In the illustrated example, the first curved portions 21*d* and 22*d* are greater in radius of curvature in a tire side view than the second curved portions 21*e* and 22*e* and the third curved portions 21*f* and 22*f*. The first curved portions 21*d* and 22*d* are arranged at a center portion in the extending directions of the first elastic connecting plate 21 and the second elastic connecting plate 22, respectively.

Further, the lengths of both the elastic connecting plates 21 and 22 are equal to each other. As illustrated in FIG. 3, the respective other end portions 21*b* and 22*b* of both the elastic connecting plates 21 and 22 are individually connected at positions separated by the same angle (e.g., 20° or more and 135° or less) from positions on the outer circumferential surface of the inner cylinder 12 opposite to the one end portions 21*a* and 22*a*, respectively, in the tire radial direction at one side and the other side in the tire circumferential direction around the axis line O in a tire side view. In addition, the first curved portions 21*d* and 22*d*, the second curved portions 21*e* and 22*e*, and the third curved portions 21*f* and 22*f* of the first elastic connecting plates 21 and the second elastic connecting plates 22 protrude to oppose each other in the tire circumferential direction and have the same size.

Accordingly, the shapes of the connecting members 15 in a tire side view is linearly symmetrical with respect to a virtual line L that extends along the tire radial direction and passes through the respective one end portions 21*a* and 22*a* of both the elastic connecting plates 21 and 22, as can be seen from a pair of the first elastic connecting plate 21 and the second elastic connecting plate 22 depicted with solid lines for emphasis in FIG. 3.

In addition, in both the elastic connecting plates 21 and 22, one end side portions extending from the center portion to the one end portions 21*a* and 22*a*, respectively, in the above-mentioned extending direction are thicker than the other end side portions extending from the center portion to the other end portions 21*b* and 22*b*, respectively, in a tire side view, as illustrated in FIG. 3. This can enhance the strength of the one end side portions that tend to be under a heavy load in the first elastic connecting plates 21 and the second elastic connecting plates 22 while preventing an increase in weight of the connecting members 15 and ensuring the flexibility of the connecting members 15. Note that the one end side portions smoothly continue to the other end side portions without any step difference.

The ring member 14 may be divided into a one-side split ring member located on one side in the tire width direction and an other-side split ring member located on the other side in the tire width direction, for example at a center portion in the tire width direction. In this case, the one-side split ring member may be formed integrally with the first elastic connecting plates 21, and the other-side split ring member may be formed integrally with the second elastic connecting plates 22. Further, the one-side split ring member and the first elastic connecting plates 21 may be formed integrally by injection molding, and the other-side split ring member and the second elastic connecting plates 22 may be formed integrally by injection molding.

The ring member 14 is fixed to a wheel portion 11 in a state where the inner cylinder 12 is fitted onto the wheel portion 11.

In the non-pneumatic tire 10 according to the present embodiment, the framework member corresponds to the ring member 14 and the connecting members 15 of the non-pneumatic tire, and the inner cylinder 12 and the outer cylinder 13 of the ring member 14 and the connecting members 15 are formed of the resin composition described above, that is, the resin composition having a bending modulus of elasticity at −20° C. according to ISO 178 of 1600 MPa or less, and a bending modulus of elasticity at 60° C. according to ISO 178 of 150 MPa or more.

Forming the inner cylinder 12, the outer cylinder 13, and the connecting members 15 from the resin composition described above, a non-pneumatic tire having a small temperature dependence of ride comfort, providing a good ride comfort over a wide temperature range, and having an excellent durability can be provided.

In the non-pneumatic tire 10 according to the present embodiment, although the inner cylinder 12, the outer cylinder 13, and the connecting members 15 need to be formed of the resin composition described above, different resin compositions may be used for the inner cylinder 12, the outer cylinder 13, and the connecting members 15 that constitute the framework member.

In the non-pneumatic tire 10 of the present embodiment, the tread member 16 is formed of a vulcanized rubber provided outside the outer cylinder 13 of the ring member 14 in the tire radial direction. More specifically, in the present embodiment, the tread member 16 is formed to be cylindrical and integrally covers the entire outer circumferential surface side of the outer cylinder 13 of the ring member 14. The tread member 16 is formed of vulcanized rubber obtained by vulcanizing a rubber composition containing, for example, natural rubber from the viewpoint of wear resistance and the like.

In the present embodiment, an adhesion layer 25 is located between the outer cylinder 13 of the ring member 14 and the tread member 16 to mediate the bonding between the outer cylinder 13 and the tread member 16. A commercially available adhesive may be used for the adhesion layer 25. Examples thereof include, but are not limited to, cyanoacrylate-based adhesives and epoxy-based adhesives specifically, Aron Alpha EXTRA 2000 (manufactured by Toagosei Co., Ltd.).

The following describes another example of the connecting members that connect the inner cylinder 12 and the outer cylinder 13 to each other.

Figure 4A:
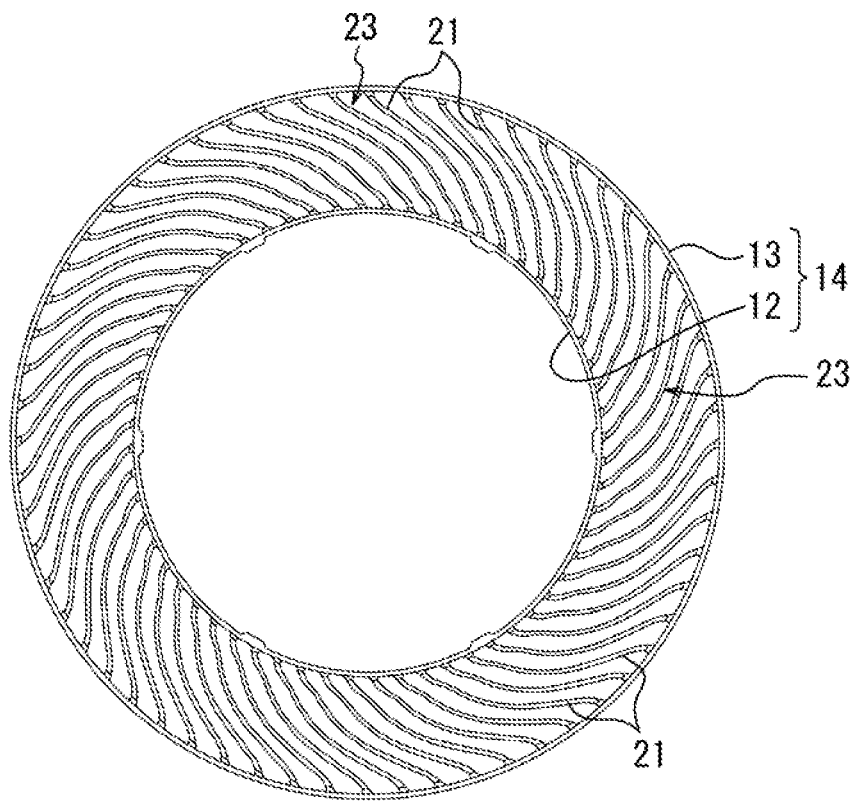
FIG. 4A is a side view illustrating an inner cylinder and an outer cylinder connected by connecting members according to another example.
Figure 4B:
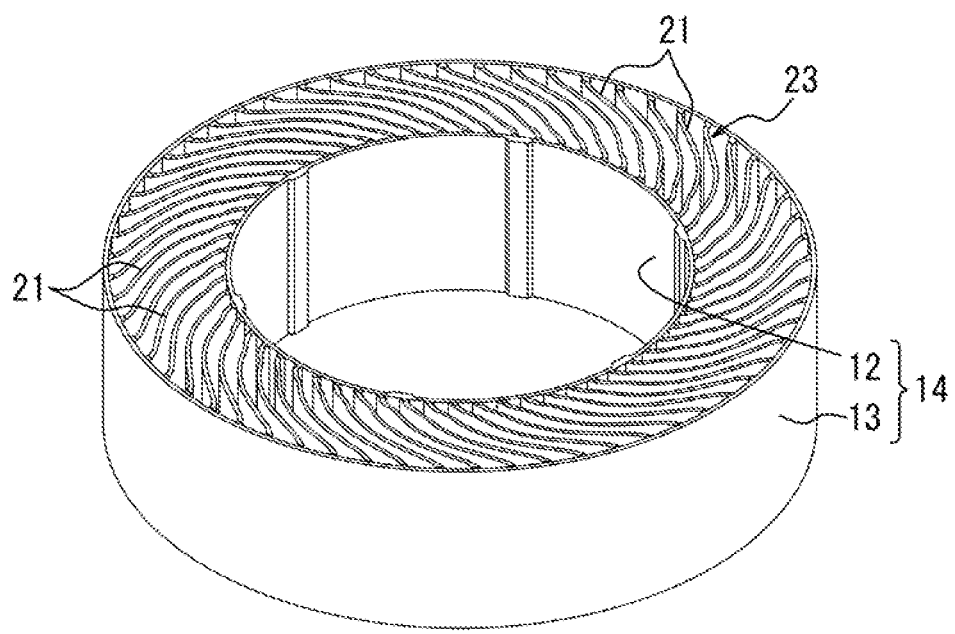
FIG. 4B is a perspective view illustrating the inner cylinder and the outer cylinder connected by the connecting members according to the other example.

FIGS. 4A and 4B illustrate an inner cylinder and an outer cylinder connected by connecting members according to another example, with FIG. 4A being a side view and FIG. 4B being a perspective view. As illustrated in FIGS. 4A and 4B, each connecting member 23 is constituted of only the first elastic connecting plate 21, unlike the connecting member 15 of the example of FIGS. 2 and 3 constituted of the first elastic connecting plate 21 and the second elastic connecting plate 22. A plurality of first elastic connecting plates 21 constituting a connecting member 23 are arranged along the tire circumferential direction between the inner cylinder 12 and the outer cylinder 13, and connect both the cylinders 12 and 13 to each other. The other configurations and functions are the same as those of the connecting members 15.

EXAMPLES

The present disclosure will be described below in detail with reference to Examples. However, the present disclosure is no way limited to the following Examples.

Examples 1 to 3, 5 and 9 and Comparative Examples 2, 5, 18 and 22

Resin compositions are prepared by mixing resin components (polymers) and additives according to the formulation provided in Table 1, Table 3, or Table 4. The bending moduli of elasticity of the obtained resin compositions are measured by the following method.
<Bending modulus of elasticity>
The bending moduli of elasticity of the resin compositions at −20° C., 0° C., 23° C., 40° C., and 60° C. are measured by a three-point bending test according to ISO178.

Next, non-pneumatic tires serving as samples are produced using the obtained resin compositions. The sample non-pneumatic tires each have a tire size of bicycle tire with an outer diameter of 20 inches (wheel size Φ340 mm, width 40 mm) and the structure illustrated in FIG. 1.

The sample non-pneumatic tires differ only in the material constituting the inner cylinder 6, the outer cylinder 4, and the connecting members 3. The same is used for the other members. The boss 8 is formed of aluminum, and the holding cylindrical portion 2a, the ribs 2b, and the externally covering cylindrical portion 2c are integrally formed of a thermoplastic resin. Tables 1 to 4 provide the types and contents of the materials contained in the resin compositions constituting the inner cylinder 6, the outer cylinder 4, and the connecting members 3.

With respect to the produced sample non-pneumatic tires, initial durability, durability against moisture and heat deterioration, durability against ultraviolet ray deterioration, and ride comfort are evaluated by the following methods.

Evaluation Method for Initial Durability

With respect to the sample tires, hemispheric projections 20 mm in diameter are attached to a drum endurance testing machine, a load of 700 N is applied in an environment of 25° C. and a humidity of 50% RH, and the running distance until failure when running at 40 km/h is measured to evaluate the initial durability. The results are classified according to the following criteria. The evaluation criteria are presented below.
Traveling distance is 5000 km or more: A
Traveling distance is 3000 km or more and less than 5000 km: B
Traveling distance is less than 3000 km: C Evaluation Method for Durability Against Moisture and Heat Deterioration The sample tires are stored for 9 days in an environment of 80° C. and 95% relative humidity. With respect to the tires after storage, hemispheric projections 20 mm in diameter are attached to a drum endurance testing machine, a load of 700 N is applied in an environment of 25° C. and a humidity of 50% RH, and the running distance until failure when running at 40 km/h is measured to evaluate the durability against moisture and heat deterioration. The results are classified according to the following criteria. The evaluation criteria are presented below.
Traveling distance is 5000 km or more: A
Traveling distance is 3000 km or more and less than 5000 km: B
Traveling distance is less than 3000 km: C Evaluation Method for Durability Against Ultraviolet Ray Deterioration The sample tires are irradiated with ultraviolet rays according to JIS K 7350-2 Method A. With respect to the tires after ultraviolet ray irradiation, hemispheric projections 20 mm in diameter are attached to a drum endurance testing machine, a load of 700 N is applied in an environment of 25° C. and a humidity of 50% RH, and the running distance until failure when running at 40 km/h is measured to evaluate the durability against ultraviolet ray deterioration (durability against UV deterioration). The results are classified according to the following criteria. The evaluation criteria are presented below.
Traveling distance is 5000 km or more: A
Traveling distance is 3000 km or more and less than 5000 km: B
Traveling distance is less than 3000 km: C Evaluation Method for Ride Comfort The sample tires are mounted on a bicycle, and the tires are run on a dry road under the environment of each of 5° C., 23° C., and 35° C., and the ride comfort is evaluated by the rider's feeling. The results are classified according to the following criteria. The evaluation criteria are presented below.
Vibration from the steering wheel and saddle does not bother: A
Vibration from the steering wheel and saddle is intense: C1
Pedaling is heavy: C2

Examples 4, 6 to 8 and 10 to 19, and Comparative Examples 1, 3, 4, 6 to 17, 19 to 21 and 23

Resin compositions are prepared according to the formulation provided in Tables 1 to 4, and the bending moduli of elasticity of the resin compositions are measured by the above method. The bending modulus of elasticity of each example is provided in Tables 1 to 4.

Non-pneumatic tires having the same configuration as the above are produced by using the obtained resin composition, and the initial durability, durability against moisture and heat deterioration, durability against ultraviolet ray deterioration, and ride comfort are evaluated for the tire according to the methods described above. The evaluations of each example are provided in Tables 1 to 4.

TABLE 1

| Formulation | | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|---|
| Polymer | PBT | PBT-1 *1 | parts by mass | 40 | — | — | 40 | 40 | 40 | 50 | 60 | 40 | 50 | 60 |
| | | PBT-2 *2 | | — | 50 | — | — | — | — | — | — | — | — | — |
| | | PBT-3 *3 | | — | — | 60 | — | — | — | — | — | — | — | — |
| | TPC | TPC-1 *4 | | 60 | — | — | 60 | 60 | 60 | 50 | 40 | 60 | 50 | 40 |
| | | TPC-2 *5 | | — | 50 | — | — | — | — | — | — | — | — | — |
| | | TPC-3 *6 | | — | — | 40 | — | — | — | — | — | — | — | — |
| | | TPC-4 *7 | | — | — | — | — | — | — | — | — | — | — | — |
| | | TPC-5 *8 | | — | — | — | — | — | — | — | — | — | — | — |
| | TPA | TPA-1 *9 | | — | — | — | — | — | — | — | — | — | — | — |
| | | TPA-2 *10 | | — | — | — | — | — | — | — | — | — | — | — |
| | PA | PA *11 | | — | — | — | — | — | — | — | — | — | — | — |
| | PPS | PPS *12 | | — | — | — | — | — | — | — | — | — | — | — |
| Additive | Moisture and heat resistant additive | Moisture and heat resistant additive-1 *13 | | — | — | — | 1 | 5 | 15 | 5 | 5 | 5 | 5 | 5 |
| | | Moisture and heat resistant additive-2 *14 | | — | — | — | — | — | — | — | — | — | — | — |
| | Weather-resistant antioxidant | Weather-resistant antioxidant-1 *15 | | 1.4 | 1.4 | 1.4 | 1.4 | 1.4 | 1.4 | 1.4 | 1.4 | 1.4 | 1.4 | 1.4 |
| | | Weather-resistant antioxidant-2 *16 | | 1.3 | 1.3 | 1.3 | 1.3 | 1.3 | 1.3 | 1.3 | 1.3 | 1.3 | 1.3 | 1.3 |
| | Heat-resistant antioxidant | Heat-resistant antioxidant-1 *17 | | 1.4 | 1.4 | 1.4 | 1.4 | 1.4 | 1.4 | 1.4 | 1.4 | 1.4 | 1.4 | 1.4 |
| | | Heat-resistant antioxidant-2 *18 | | 0.7 | 0.7 | 0.7 | 0.7 | 0.7 | 0.7 | 0.7 | 0.7 | 0.7 | 0.7 | 0.7 |
| Characteristics | Bending modulus of elasticity | (F) Bending modulus of elasticity at −20° C. | MPa | 1005 | 1262 | 1519 | 985 | 908 | 617 | 1140 | 1373 | 911 | 1143 | 1376 |
| | | (X) Bending modulus of elasticity at 0° C. | MPa | 871 | 1102 | 1332 | 851 | 773 | 526 | 977 | 1182 | 776 | 980 | 1185 |
| | | (Z) Bending modulus of elasticity at 23° C. | MPa | 730 | 930 | 1130 | 683 | 497 | 338 | 633 | 769 | 500 | 636 | 772 |
| | | (Y) Bending modulus of elasticity at 40° C. | MPa | 399 | 577 | 755 | 373 | 271 | 184 | 392 | 513 | 274 | 395 | 516 |
| | | (G) Bending modulus of elasticity at 60° C. | MPa | 203 | 357 | 510 | 197 | 171 | 152 | 300 | 429 | 174 | 303 | 432 |
| | | (F)/(G) | | 4.9 | 3.5 | 3.0 | 5.0 | 5.3 | 4.1 | 3.8 | 3.2 | 5.2 | 3.8 | 3.2 |
| Evaluation | Durability | Evaluation result of initial durability | | A | A | A | A | A | B | A | A | A | A | A |
| | | Evaluation result of durability against moisture and heat deterioration | | A | A | A | A | A | B | A | A | A | A | A |
| | | Evaluation result of durability against UV deterioration | | A | A | A | A | A | B | A | A | A | A | A |
| | Ride comfort | Evaluation result of ride comfort at 5° C. | | A | A | A | A | A | A | A | A | A | A | A |
| | | Evaluation result of ride comfort at 23° C. | | A | A | A | A | A | A | A | A | A | A | A |
| | | Evaluation result of ride comfort at 35° C. | | A | A | A | A | A | A | A | A | A | A | A |

TABLE 2

| Formulation | Polymer | | | | | | Example 12 | Example 13 | Example 14 | Example 15 | Example 16 | Example 17 | Example 18 | Example 19 |
|---|---|---|---|---|---|---|---|---|---|---|---|---|---|---|
| | PBT | PBT-1 *1 | | | | parts by mass | 40 | 50 | 60 | 50 | — | — | — | — |
| | | PBT-2 *2 | | | | | — | — | — | — | 40 | 60 | 50 | — |
| | | PBT-3 *3 | | | | | — | — | — | — | — | — | — | — |
| | TPC | TPC-1 *4 | | | | | — | — | — | — | — | — | — | — |
| | | TPC-2 *5 | | | | | — | — | — | — | — | — | — | — |
| | | TPC-3 *6 | | | | | 60 | 50 | 40 | 50 | 60 | 40 | 50 | — |
| | | TPC-4 *7 | | | | | — | — | — | — | — | — | — | — |
| | TPA | TPA-1 *9 | | | | | — | — | — | — | — | — | — | 70 |
| | | TPA-2 *10 | | | | | — | — | — | — | — | — | — | 30 |
| | PA | PA *11 | | | | | — | — | — | — | — | — | — | — |
| | PPS | PPS *12 | | | | | — | — | — | — | — | — | — | — |
| | Additive | Moisture and heat resistant additive | Moisture and heat resistant additive-1 *13 | | | | 5 | 5 | 5 | — | 5 | 5 | — | — |
| | | | Moisture and heat resistant additive-2 *14 | | | | — | — | — | — | — | — | 5 | — |
| | | Weather-resistant antioxidant | Weather-resistant antioxidant-1 *15 | | | | 1.4 | 1.4 | 1.4 | 1.4 | 1.4 | 1.4 | 1.4 | 1.4 |
| | | | Weather-resistant antioxidant-2 *16 | | | | 1.3 | 1.3 | 1.3 | 1.3 | 1.3 | 1.3 | 1.3 | 1.3 |
| | | Heat-resistant antioxidant | Heat-resistant antioxidant-1 *17 | | | | 1.4 | 1.4 | 1.4 | 1.4 | 1.4 | 1.4 | 1.4 | 1.4 |
| | | | Heat-resistant antioxidant-2 *18 | | | | 0.7 | 0.7 | 0.7 | 0.7 | 0.7 | 0.7 | 0.7 | 0.7 |
| Characteristics | Bending modulus of elasticity | (F) Bending modulus of elasticity at −20° C. | | | | MPa | 911 | 1143 | 1376 | 1146 | 910 | 1375 | 1145 | 1047 |
| | | (X) Bending modulus of elasticity at 0° C. | | | | MPa | 776 | 980 | 1185 | 983 | 775 | 1184 | 982 | 880 |
| | | (Z) Bending modulus of elasticity at 23° C. | | | | MPa | 500 | 636 | 772 | 639 | 499 | 771 | 638 | 421 |
| | | (Y) Bending modulus of elasticity at 40° C. | | | | MPa | 274 | 395 | 516 | 398 | 273 | 515 | 397 | 410 |
| | | (G) Bending modulus of elasticity at 60° C. | | | | MPa | 174 | 303 | 432 | 306 | 173 | 431 | 305 | 200 |
| | | (F)/(G) | | | | — | 5.2 | 3.8 | 3.2 | 3.7 | 5.3 | 3.2 | 3.8 | 5.1 |
| Evaluation | Durability | Evaluation result of initial durability | | | | — | A | A | A | A | A | A | A | A |
| | | Evaluation result of durability against moisture and heat deterioration | | | | — | A | A | A | A | A | A | A | A |
| | | Evaluation result of durability against UV deterioration | | | | — | A | A | A | A | A | A | A | A |
| | Ride comfort | Evaluation result of ride comfort at 5° C. | | | | — | A | A | A | A | A | A | A | A |
| | | Evaluation result of ride comfort at 23° C. | | | | — | A | A | A | A | A | A | A | A |
| | | Evaluation result of ride comfort at 35° C. | | | | — | A | A | A | A | A | A | A | A |

TABLE 3

| Formulation | Polymer | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|---|---|
| | PBT | PBT-1 *1 | parts by mass | 35 | — | — | — | — | 65 | — | — | — | — |
| | | PBT-2 *2 | | — | 65 | — | 65 | — | — | — | 65 | — | — |
| | | PBT-3 *3 | | — | — | 35 | — | 35 | — | 35 | — | 40 | 40 |
| | TPC | TPC-1 *4 | | 65 | — | — | — | — | — | — | — | — | — |
| | | TPC-2 *5 | | — | 35 | 65 | 35 | — | 35 | 65 | 35 | 60 | — |
| | | TPC-3 *6 | | — | — | — | — | 65 | — | — | — | — | 60 |
| | | TPC-4 *7 | | — | — | — | — | — | — | — | — | — | — |
| | | TPC-5 *8 | | — | — | — | — | — | — | — | — | — | — |
| | TPA | TPA-1 *9 | | — | — | — | — | — | — | — | — | — | — |
| | | TPA-2 *10 | | — | — | — | — | — | — | — | — | — | — |
| | PA | PA *11 | | — | — | — | — | — | — | — | — | — | — |
| | PPS | PPS *12 | | — | — | — | — | — | — | — | — | — | — |
| | Additive | Moisture and heat resistant additive-1 *13 | | — | — | — | — | — | — | — | — | 16 | 16 |
| | | Moisture and heat resistant additive-2 *14 | | — | — | — | — | — | — | — | — | — | — |
| | Weather-resistant antioxidant | Weather-resistant antioxidant-1 *15 | | 1.4 | 1.4 | 1.4 | 1.4 | 1.4 | 1.4 | 1.4 | 1.4 | 1.4 | 1.4 |
| | | Weather-resistant antioxidant-2 *16 | | 1.3 | 1.3 | 1.3 | 1.3 | 1.3 | 1.3 | 1.3 | 1.3 | 1.3 | 1.3 |
| | Heat-resistant antioxidant | Heat-resistant antioxidant-1 *17 | | 1.4 | 1.4 | 1.4 | 1.4 | 1.4 | 1.4 | 1.4 | 1.4 | 1.4 | 1.4 |
| | | Heat-resistant antioxidant-2 *18 | | 0.7 | 0.7 | 0.7 | 0.7 | 0.7 | 0.7 | 0.7 | 0.7 | 0.7 | 0.7 |
| Characteristics | Bending modulus of elasticity | (F) Bending modulus of elasticity at −20° C. | MPa | 586 | 1648 | 587 | 1646 | 588 | 1651 | 590 | 1645 | 596 | 604 |
| | | (X) Bending modulus of elasticity at 0° C. | MPa | 495 | 1448 | 496 | 1446 | 497 | 1451 | 499 | 1445 | 505 | 513 |
| | | (Z) Bending modulus of elasticity at 23° C. | MPa | 293 | 1230 | 296 | 1228 | 297 | 1233 | 299 | 1227 | 320 | 307 |
| | | (Y) Bending modulus of elasticity at 40° C. | MPa | 153 | 844 | 154 | 842 | 155 | 847 | 157 | 841 | 163 | 141 |
| | | (G) Bending modulus of elasticity at 60° C. | MPa | 100 | 586 | 101 | 584 | 102 | 589 | 104 | 583 | 110 | 118 |
| | | (F)/(G) | | 5.8 | 2.8 | 5.8 | 2.8 | 5.7 | 2.8 | 5.7 | 2.8 | 5.4 | 5.1 |
| Evaluation | Durability | Evaluation result of initial durability | | C | C | C | C | C | C | C | C | C | C |
| | | Evaluation result of durability against moisture and heat deterioration | | C | C | C | C | C | C | C | C | C | C |
| | | Evaluation result of durability against UV deterioration | | C | C | C | C | C | C | C | C | C | C |
| | Ride comfort | Evaluation result of ride comfort at 5° C. | | C2 | C1 | C2 | C1 | A | C1 | A | C1 | A | A |
| | | Evaluation result of ride comfort at 23° C. | | C2 | A | C2 | A | A | C1 | A | C1 | A | A |
| | | Evaluation result of ride comfort at 35° C. | | C2 | A | C2 | A | C2 | C1 | C2 | C1 | C2 | C2 |

TABLE 4

| | | | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 | Comparative Example 23 |
|---|---|---|---|---|---|---|---|---|---|---|---|---|---|---|---|
| Formulation | Polymer | PBT | PBT-1 *1 | 100 | — | — | — | — | — | — | — | — | — | 50 | — | — |
| | | | PBT-2 *2 | — | 100 | — | — | — | — | — | — | — | — | — | — | — |
| | | | PBT-3 *3 | — | — | 100 | — | — | — | — | — | — | — | — | — | — |
| | | TPC | TPC-1 *4 | — | — | — | 100 | — | — | — | — | 60 | — | — | — | — |
| | | | TPC-2 *5 | — | — | — | — | 100 | — | — | — | — | 25 | — | — | — |
| | | | TPC-3 *6 | — | — | — | — | — | 100 | — | — | — | — | — | — | — |
| | | | TPC-4 *7 | — | — | — | — | — | — | — | — | — | — | 50 | — | — |
| | | | TPC-5 *8 | — | — | — | — | — | — | 100 | — | 40 | 75 | — | — | — |
| | | TPA | TPA-1 *9 | — | — | — | — | — | — | — | — | — | — | — | 75 | — |
| | | | TPA-2 *10 | — | — | — | — | — | — | — | — | — | — | — | 25 | — |
| | | PA | PA *11 | — | — | — | — | — | — | — | 100 | — | — | — | — | — |
| | | PPS | PPS *12 | — | — | — | — | — | — | — | — | — | — | — | — | 100 |
| | Additive | Moisture and heat resistant additive | Moisture and heat resistant additive-1 *13 | 5 | — | — | 5 | — | — | 5 | — | 5 | — | — | — | — |
| | | | Moisture and heat resistant additive-2 *14 | — | — | — | — | — | — | — | — | — | — | — | — | — |
| | | Weather-resistant antioxidant | Weather-resistant antioxidant-1 *15 | 1.4 | 1.4 | 1.4 | 1.4 | 1.4 | 1.4 | 1.4 | 1.4 | 1.4 | 1.4 | 1.4 | 1.4 | 1.4 |
| | | | Weather-resistant antioxidant-2 *16 | 1.3 | 1.3 | 1.3 | 1.3 | 1.3 | 1.3 | 1.3 | 1.3 | 1.3 | 1.3 | 1.3 | 1.3 | 1.3 |
| | | Heat-resistant antioxidant | Heat-resistant antioxidant-1 *17 | 1.4 | 1.4 | 1.4 | 1.4 | 1.4 | 1.4 | 1.4 | 1.4 | 1.4 | 1.4 | 1.4 | 1.4 | 1.4 |
| | | | Heat-resistant antioxidant-2 *18 | 0.7 | 0.7 | 0.7 | 0.7 | 0.7 | 0.7 | 0.7 | 0.7 | 0.7 | 0.7 | 0.7 | 0.7 | 0.7 |
| Characteristics | Bonding modulus of elasticity | (F) Bending modulus of elasticity at −20° C. | MPa | 3235 | 3241 | 3232 | 201 | 204 | 203 | 204 | 2165 | 200 | 205 | 602 | 1724 | 3714 |
| | | (X) Bending modulus of elasticity at 0° C. | MPa | 3097 | 3103 | 3094 | 122 | 125 | 124 | 115 | 1989 | 120 | 120 | 510 | 1428 | 3519 |
| | | (Z) Bending modulus of elasticity at 23° C. | MPa | 2910 | 2916 | 2907 | 83 | 86 | 85 | 75 | 1043 | 80 | 78 | 305 | 1366 | 3623 |
| | | (Y) Bending modulus of elasticity at 40° C. | MPa | 2733 | 2739 | 2730 | 52 | 55 | 54 | 54 | 463 | 50 | 58 | 169 | 981 | 3527 |
| | | (G) Bending modulus of elasticity at 60° C. | MPa | 1189 | 1195 | 1186 | 38 | 41 | 40 | 27 | 429 | 35 | 30 | 115 | 622 | 3414 |
| | | (F)/(G) | — | 2.7 | 2.7 | 2.7 | 5.3 | 5.0 | 5.1 | 7.6 | 5.0 | 5.7 | 6.8 | 5.1 | 2.8 | 1.1 |
| Evaluation | Durability | Evaluation result of initial durability | — | C | C | C | C | C | C | C | A | C | C | B | C | A |
| | | Evaluation result of durability against moisture and heat deterioration | — | C | C | C | C | C | C | C | A | C | C | C | C | A |
| | | Evaluation result of durability against UV deterioration | — | C | C | C | C | C | C | C | A | C | C | B | C | A |

TABLE 4-continued

| | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 | Comparative Example 23 |
|---|---|---|---|---|---|---|---|---|---|---|---|---|---|
| Ride comfort | Evaluation result of ride comfort at 5° C. | C1 | C1 | C1 | C2 | C2 | C2 | C2 | C1 | C2 | C2 | A | C1 | C1 |
| | Evaluation result of ride comfort at 23° C. | C1 | C1 | C1 | C2 | C2 | C2 | C2 | A | C2 | C2 | A | C1 | C1 |
| | Evaluation result of ride comfort at 35° C. | C1 | C1 | C1 | C2 | C2 | C2 | C2 | A | C2 | C2 | C2 | C1 | C1 |

*1 PBT-1: Polybutylene terephthalate, manufactured by Toray Industries, Inc., trade name "TORAYCON 1401X06"
*2 PBT-2: Polybutylene terephthalate, manufactured by Toray Industries, Inc., trade name "TORAYCON 1401X70"
*3 PBT-3: Polybutylene terephthalate, manufactured by Toyobo Co., Ltd., trade name "PLANAC BT-1000"
*4 TPC-1: Polyester-based thermoplastic elastomer whose hard segment is polybutylene terephthalate, manufactured by Du Pont-Toray Co., Ltd., trade name "HYTREL 5557"
*5 TPC-2: Polyester-based thermoplastic elastomer whose hard segment is polybutylene terephthalate, manufactured by Du Pont-Toray Co., Ltd., trade name "HYTREL 5577R-07"
*6 TPC-3: Polyester-based thermoplastic elastomer whose hard segment is polybutylene terephthalate, manufactured by Toyobo Co., Ltd., trade name "PELPRENE P90B"
*7 TPC-4: Polyester-based thermoplastic elastomer whose hard segment is polybutylene terephthalate, manufactured by Du Pont-Toray Co., Ltd., trade name "HYTREL 3046"
*8 TPC-5: Polyester-based thermoplastic elastomer whose hard segment is polybutylene terephthalate, manufactured by Du Pont-Toray Co., Ltd., trade name "HYTREL 4767N"
*9 TPA-1: Polyamide-based thermoplastic elastomer whose hard segment is nylon-12, manufactured by Ube Industries, Ltd., trade name "XPA9055"
*10 TPA-2: Polyamide-based thermoplastic elastomer whose hard segment is nylon-12, manufactured by Ube Industries, Ltd., trade name "XPA9048"
*11 PA: Nylon-12, manufactured by Ube Industries, Ltd., trade name "3020U"
*12 PPS: Polyphenylene sulfide, manufactured by DIC Corporation, trade name "FZ2100"
*13 Moisture and heat resistant additive-1: epoxy compound, manufactured by Adeka Corporation, trade name "ADEKASIZER O-130P", epoxidized soybean oil
*14 Moisture and heat resistant additive-2: epoxy compound, manufactured by Adeka Corporation, trade name "ADEKASIZER O-180A", epoxidized linseed oil
*15 Weather-resistant antioxidant-1: manufactured by BASF, trade name "Tinuvin 326", 2-[5-chloro(2H)-benzotriazol-2-yl]-4-methyl-6-(tert-butyl)phenol
*16 Weather-resistant antioxidant-2: manufactured by BASF, trade name "Tinuvin PA144", bis(1,2,2,6,6-pentamethyl-4-piperidinyl) [[3,5-bis(1,1-dimethylethyl)-4-hydroxyphenyl]methyl] butylmalonate
*17 Heat-resistant antioxidant-1: manufactured by BASF, trade name "Irganox 1010", pentaerythritol tetrakis[3-(3,5-di-tert-butyl-4-hydroxyphenyl)propionate]
*18 Heat-resistant antioxidant-2: manufactured by BASF, trade name "Irganox 1098", N,N'-hexamethylene bis[3-(3,5-di-tert-butyl-4-hydroxyphenyl)propanamide]

From Tables 1 and 2, it can be seen that the tires of the examples according to the present disclosure have a high durability and an excellent ride comfort. In the evaluation results, those that do not include C, C1, and C2 are non-pneumatic tires having a small temperature dependence of ride comfort, providing a good ride comfort over a wide temperature range, and having an excellent durability.

In contrast, from Comparative Examples 1, 3, 5, 7, 14 to 17, and 19 to 21, it can be seen that when the bending modulus of elasticity at 60° C. of the resin composition used for a framework member is less than 150 MPa, the pedaling becomes heavy.

Also, from Comparative Examples 2, 4, 6, 8, 11 to 13, it can be seen that when the bending modulus of elasticity at −20° C. of the resin composition used for a framework member exceeds 1600 MPa, the framework member becomes too hard, and the ride comfort and durability deteriorate.

Also, from Comparative Examples 9 and 10, it can be seen that when the moisture and heat resistant additive is excessively used and the bending modulus of elasticity at 60° C. of the resin composition is set to be less than 150 MPa, the unreacted moisture and heat resistant additive undergoes phase separation and the weld strength is decreased, resulting in a decrease in durability.

Also, from Comparative Examples 18 and 23, it can be seen that when only the polyamide resin or only the polyphenylene sulfide is used as the resin component and the bending modulus of elasticity at −20° C. of the resin composition used for a framework member is set to be more than 1600 MPa, the framework member becomes too hard and the ride comfort deteriorates.

REFERENCE SIGNS LIST

1 Non-pneumatic tire
2 Wheel portion
2a Holding cylindrical portion
2b Rib
2c Externally covering cylindrical portion
3 Connecting member
3a Inner portion
3b Outer portion
4 Outer cylinder
5 Tread member
6 Inner cylinder
7 Tire portion
8 Boss
10 Non-pneumatic tire
11 Wheel portion
12 Inner cylinder
13 Outer cylinder
14 Ring member
15 Connecting member
16 Tread member
17 Holding cylindrical portion
18 Outer ring portion
19 Rib
21 First elastic connecting plate (connecting member)
21a One end portion
21b Other end portion
21c Intermediate portion
21d to 21f Curved portion
22 Second elastic connecting plate (connecting member)
22a One end portion
22b Other end portion
22c Intermediate portion
22d to 22f Curved portion
23 Connecting member
25 Adhesion layer

The invention claimed is:

1. A non-pneumatic tire using a resin composition for a framework member, the resin composition having a bending modulus of elasticity at −20° C. according to ISO 178 of 1600 MPa or less, and a bending modulus of elasticity at 60° C. according to ISO 178 of 150 MPa or more, wherein the resin composition comprises a thermoplastic elastomer (A) having a hard segment and a soft segment in a molecule thereof, and a resin (B) of the same kind as the hard segment other than the thermoplastic elastomer (A).

2. The non-pneumatic tire according to claim 1, wherein the thermoplastic elastomer (A) is a polyester-based thermoplastic elastomer, and the resin (B) is a polyester resin.

3. The non-pneumatic tire according to claim 2, wherein the hard segment of the polyester-based thermoplastic elastomer is polybutylene terephthalate, and the polyester resin is polybutylene terephthalate.

4. The non-pneumatic tire according to claim 3, wherein a mass ratio of the thermoplastic elastomer (A) to the resin (B), A/B, is 60/40 to 40/60.

5. The non-pneumatic tire according to claim 4, comprising:
a wheel portion to be attached to an axle;
an inner cylinder externally covering the wheel portion;
an outer cylinder surrounding the inner cylinder from an outside in a tire radial direction;
a plurality of connecting members arranged along a tire circumferential direction between the inner cylinder and the outer cylinder and connecting the inner cylinder and the outer cylinder to each other; and
a tread member provided outside the outer cylinder in the tire radial direction,
wherein the inner cylinder, the outer cylinder, and the connecting members serving as the framework member are formed of the resin composition.

6. The non-pneumatic tire according to claim 3, comprising:
a wheel portion to be attached to an axle;
an inner cylinder externally covering the wheel portion;
an outer cylinder surrounding the inner cylinder from an outside in a tire radial direction;
a plurality of connecting members arranged along a tire circumferential direction between the inner cylinder and the outer cylinder and connecting the inner cylinder and the outer cylinder to each other; and
a tread member provided outside the outer cylinder in the tire radial direction,
wherein the inner cylinder, the outer cylinder, and the connecting members serving as the framework member are formed of the resin composition.

7. The non-pneumatic tire according to claim 2, wherein a mass ratio of the thermoplastic elastomer (A) to the resin (B), A/B, is 60/40 to 40/60.

8. The non-pneumatic tire according to claim 7, comprising:
a wheel portion to be attached to an axle;
an inner cylinder externally covering the wheel portion;
an outer cylinder surrounding the inner cylinder from an outside in a tire radial direction;
a plurality of connecting members arranged along a tire circumferential direction between the inner cylinder and the outer cylinder and connecting the inner cylinder and the outer cylinder to each other; and a tread member provided outside the outer cylinder in the tire radial direction, wherein the inner cylinder, the outer cylinder, and the connecting members serving as the framework member are formed of the resin composition.

9. The non-pneumatic tire according to claim 2, comprising:

a wheel portion to be attached to an axle;

an inner cylinder externally covering the wheel portion;

an outer cylinder surrounding the inner cylinder from an outside in a tire radial direction;

a plurality of connecting members arranged along a tire circumferential direction between the inner cylinder and the outer cylinder and connecting the inner cylinder and the outer cylinder to each other; and a tread member provided outside the outer cylinder in the tire radial direction, wherein the inner cylinder, the outer cylinder, and the connecting members serving as the framework member are formed of the resin composition.

10. The non-pneumatic tire according to claim 1, wherein a mass ratio of the thermoplastic elastomer (A) to the resin (B), A/B, is 60/40 to 40/60.

11. The non-pneumatic tire according to claim 10, comprising:

a wheel portion to be attached to an axle;

an inner cylinder externally covering the wheel portion;

an outer cylinder surrounding the inner cylinder from an outside in a tire radial direction;

a plurality of connecting members arranged along a tire circumferential direction between the inner cylinder and the outer cylinder and connecting the inner cylinder and the outer cylinder to each other; and a tread member provided outside the outer cylinder in the tire radial direction, wherein the inner cylinder, the outer cylinder, and the connecting members serving as the framework member are formed of the resin composition.

12. The non-pneumatic tire according to claim 1, comprising:

a wheel portion to be attached to an axle;

an inner cylinder externally covering the wheel portion;

an outer cylinder surrounding the inner cylinder from an outside in a tire radial direction;

a plurality of connecting members arranged along a tire circumferential direction between the inner cylinder and the outer cylinder and connecting the inner cylinder and the outer cylinder to each other; and a tread member provided outside the outer cylinder in the tire radial direction, wherein the inner cylinder, the outer cylinder, and the connecting members serving as the framework member are formed of the resin composition.

* * * * *